US011854146B1

(12) United States Patent
Smith et al.

(10) Patent No.: US 11,854,146 B1
(45) Date of Patent: Dec. 26, 2023

(54) THREE-DIMENSIONAL BODY COMPOSITION FROM TWO-DIMENSIONAL IMAGES OF A PORTION OF A BODY

(71) Applicant: Amazon Technologies, Inc., Seattle, WA (US)

(72) Inventors: Brandon Michael Smith, Fremont, CA (US); JinJin Li, San Jose, CA (US); Amit Kumar Agrawal, Santa Clara, CA (US); Visesh Uday Kumar Chari, Santa Cruz, CA (US); Durga Venkata Kiran Yakkala, Eluru (IN); Prakash Ramu, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/358,679

(22) Filed: Jun. 25, 2021

(51) Int. Cl.
| G06T 17/10 | (2006.01) |
| G06T 15/20 | (2011.01) |
| G06T 15/04 | (2011.01) |
| G06T 19/20 | (2011.01) |

(52) U.S. Cl.
CPC .............. *G06T 17/10* (2013.01); *G06T 15/04* (2013.01); *G06T 15/205* (2013.01); *G06T 19/20* (2013.01); *G06T 2219/2004* (2013.01)

(58) Field of Classification Search
CPC ....... G06T 17/10; G06T 15/04; G06T 15/205; G06T 19/20; G06T 2219/2004
See application file for complete search history.

(56) References Cited

U.S. PATENT DOCUMENTS

| 6,188,925 B1 | 2/2001 | Kawanishi et al. |
| 6,468,209 B1 | 10/2002 | Heymsfield et al. |
| 8,918,162 B2 | 12/2014 | Prokoski |

(Continued)

FOREIGN PATENT DOCUMENTS

| CA | 2884668 A1 | 9/2016 |
| CN | 106295205 A | 1/2017 |

(Continued)

OTHER PUBLICATIONS

Zhang, Tianshu, Buzhen Huang, and Yangang Wang. "Object-occluded human shape and pose estimation from a single color image." Proceedings of the IEEE/CVF conference on computer vision and pattern recognition. 2020. (Year: 2020).*

(Continued)

*Primary Examiner* — Daniel F Hajnik
(74) *Attorney, Agent, or Firm* — Athorus, PLLC

(57) ABSTRACT

Described are systems and methods directed to generation of a dimensionally accurate three-dimensional ("3D") model of a body, such as a human body, based on two-dimensional ("2D") images of at least a portion of that body. A user may use a 2D camera, such as a digital camera typically included in many of today's portable devices (e.g., cell phones, tablets, laptops, etc.) and obtain a series of 2D body images of at least a portion of their body from different views with respect to the camera. The 2D body images may then be used to generate a plurality of predicted body parameters corresponding to the body represented in the 2D body images. Those predicted body parameters may then be further processed to generate a dimensionally accurate 3D model or avatar of the body of the user.

19 Claims, 10 Drawing Sheets

(56) References Cited

U.S. PATENT DOCUMENTS

| | | | |
|---|---|---|---|
| 8,982,147 | B2 | 3/2015 | Ramani et al. |
| 9,801,550 | B2 | 10/2017 | Ferrantelli |
| 9,839,376 | B1 | 12/2017 | Ross et al. |
| 10,321,728 | B1 | 6/2019 | Koh et al. |
| 10,489,683 | B1 | 11/2019 | Koh et al. |
| 10,559,111 | B2 | 2/2020 | Sachs et al. |
| 10,636,158 | B1 | 4/2020 | Kamiyama et al. |
| 10,657,709 | B2 | 5/2020 | Moore et al. |
| 10,748,217 | B1 | 8/2020 | Ross et al. |
| 10,796,480 | B2 | 10/2020 | Chen et al. |
| 10,926,404 | B2 | 2/2021 | Jackson et al. |
| 10,945,813 | B2 | 3/2021 | Li et al. |
| 2004/0151366 | A1 | 8/2004 | Nefian et al. |
| 2005/0251347 | A1 | 11/2005 | Perona et al. |
| 2006/0061583 | A1 | 3/2006 | Spooner et al. |
| 2006/0222206 | A1 | 10/2006 | Garoutte |
| 2013/0325493 | A1 | 12/2013 | Wong et al. |
| 2014/0121564 | A1 | 5/2014 | Raskin |
| 2014/0340479 | A1 | 11/2014 | Moore et al. |
| 2015/0154453 | A1 | 6/2015 | Wilf |
| 2016/0247017 | A1 | 8/2016 | Sareen et al. |
| 2016/0284123 | A1 | 9/2016 | Hare et al. |
| 2017/0273639 | A1 | 9/2017 | Iscoe et al. |
| 2018/0089821 | A1 | 3/2018 | Koldyshev |
| 2018/0289334 | A1 | 10/2018 | Brouwer et al. |
| 2019/0122424 | A1 | 4/2019 | Moore et al. |
| 2019/0191137 | A1 | 6/2019 | Bisti |
| 2019/0347817 | A1 | 11/2019 | Ferrantelli et al. |
| 2020/0193710 | A1 | 6/2020 | Talgorn et al. |
| 2020/0319015 | A1 | 10/2020 | Kamiyama et al. |
| 2021/0097759 | A1 | 4/2021 | Agrawal et al. |
| 2021/0232924 | A1* | 7/2021 | Sun .................. G06V 40/11 |
| 2022/0147735 | A1 | 5/2022 | Suh et al. |
| 2022/0292351 | A1 | 9/2022 | Etemad et al. |
| 2023/0065288 | A1 | 3/2023 | Valsan et al. |

FOREIGN PATENT DOCUMENTS

| | | |
|---|---|---|
| CN | 108652584 A | 10/2018 |
| CN | 110051353 A | 7/2019 |
| WO | 2022204343 A1 | 9/2022 |

OTHER PUBLICATIONS

Biggs, Benjamin, et al. "3d multi-bodies: Fitting sets of plausible 3d human models to ambiguous image data." Advances in Neural Information Processing Systems 33 (2020): 20496-20507. (Year: 2020).*

Seo, Hyewon, Young In Yeo, and Kwangyun Wohn. "3D body reconstruction from photos based on range scan." International Conference on Technologies for E-Learning and Digital Entertainment. Springer, Berlin, Heidelberg, 2006. (Year: 2006).*

Kanazawa, Angjoo, et al. "End-to-end Recovery of Human Shape and Pose." arXiv preprint arXiv:1712.06584v2 (2018). (Year: 2018).*

Zhao, Ruiqi, Yan Wang, and Aleix M. Martinez. "A simple, fast and highly-accurate algorithm to recover 3d shape from 2d landmarks on a single image." IEEE transactions on pattern analysis and machine intelligence 40.12 (2017): 3059-3066. (Year: 2018).*

Tome, D., Russell, C. and Agapito, L. Lifting from the Deep: Convolutional 3D Pose Estimation from a Single Image. In Proceedings of the IEEE Conference on Computer Vision and Pattern Recognition 2017 (pp. 2500-2509), 11 pages.

Varol, G., Ceylan, D., Russell, B., Yang, J., Yumer, E., Laptev, I. and Schmid, C., "BodyNet: Volumetric Inference of 3D Human Body Shapes," In European Conference on Computer Vision (ECCV), 2018, 17 pages.

Varol, G., Romero, J., Martin, X., Mahmood, N., Black, M. J., Laptev, I. and Schmid, C., "Learning from Synthetic Humans," In IEEE Conference on Computer Vision and Pattern Recognition (CVPR), 2017, 9 pages.

Wiles, Olivia and Andrew Zisserman, "SilNet: Single- and Multi-View Reconstruction by Learning from Silhouettes," Visual Geometry Group, Department of Engineering Science, University of Oxford, Oxford, UK, arXiv preprint arXiv: 1711.07888. Nov. 21, 2017, Cornell University, URL: https://arxiv.org/pdf/1711.07888.pdf, 13 pages.

Xi, P., Lee, W.-S. and Shu, C., "A Data-Driven Approach to Human-Body Cloning Using a Segmented Body Database," In Pacific Conference on Computer Graphics and Applications (PG), 2007, 9 pages.

Xie, H., Yao, H., Sun, X., Zhou, S. and Zhang, S. Pix2Vox: Context-aware 3D Reconstruction from Single and Multi-view Images. arXiv preprint arXiv: 1901.11153, https://arxiv.org/pdf/1901.11153.pdf, Jul. 29, 2019, 9 pages.

Yu, F., Zhang, Y., Song, S., Seff, A., and Xiao, J., "LSUN: Construction of a Large-Scale Image Dataset Using Deep Learning with Humans in the Loop," arXiv preprint arXiv: 1506.03365, 2015, 9 pages.

Zanfir, A., Marinoiu, E. and Sminchisescu, C., "Monocular 3D Pose and Shape Estimation of Multiple People in Natural Scenes—the Importance of Multiple Scene Constraints," In IEEE Conference on Computer Vision and Pattern Recognition (CVPR), 2018, 10 pages.

Zhang, H., Dana, K., Shi, J., Zhang, Z., Wang, X., Tyagi, A. and Agrawal, A., "Context Encoding for Semantic Segmentation," In The IEEE Conference on Computer Vision and Pattern Recognition (CVPR), Jun. 2018, 10 pages.

Zhu, R., H. Kiani Galoogahi, C. Wang and S. Lucey, "Rethinking Reprojection: Closing the Loop for Pose-aware Shape Reconstruction from a Single Image," The Robotics Institute, Carnegie Mellon University, In Proceedings of the IEEE International Conference on Computer Vision, Jul. 26, 2017 (pp. 57-65), 9 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Anguelov, D., Srinivasan, P., Koller, D., Thrun, S., Rodgers, J. and Davis, J., "SCAPE: Shape Completion and Animation of People," ACM Trans. Graph. (Proc. SIGGRAPH), 24(3):408-416, Jul. 2005, 9 pages, http://robots.stanford.edu/papers/anguelov.shapecomp.pdf.

Anonymous: "BMI 3D", www.bmi3d.de; Nov. 25, 2018 (Nov. 25, 2018), XP002801424,URL: https://web.archive.org/web/20181125231845/https://www.bmi3d.de/rechner.html [Retrieved from the Internet on Dec. 16, 2020]; the whole document.

Anonymous: "Documentation: What is MakeHuman?", MakeHuman, May 20, 2016 (May 20, 2016), XP002801426, URL: http://www.makehumancommunity.org/wiki/Documentation:What is MakeHuman%3F [Retrieved from the Internet on Jan. 30, 2021]; the whole document.

Anonymous: "Virtual Weight Loss Simulator", www.changeinseconds.com; Dec. 11, 2016 (Dec. 11, 2016), XP002801425, URL: https://web.archive.org/web/20161206202928;%20/http://www.changeinseconds.com/simulator/ [Retrieved from the Internet on Dec. 16, 2020]; the whole document.

Balan, A. O. and Black, M. J., "The Naked Truth: Estimating Body Shape under Clothing," In European Conference an Computer Vision (ECCV), 2008, 15 pages, https://www.researchgate.net/profile/Michael_Black6/publication/221305001_The_Naked_Truth_Estimating_Body_Shape_Under_Clothing/links/0fcfd512d21f538458000000/The-Naked-Truth-Estimating-Body-Shape-Under-Clothing.pdf?origin=publication detail.

(56) References Cited

OTHER PUBLICATIONS

Bălan, A. O., Sigal, L., Black, M. J., Davis, J. E. and Haussecker, H. W., "Detailed Human Shape and Pose from Images," In IEEE Conference on Computer Vision and Pattern Recognition (CVPR), 2007, 9 pages.
Bogo, F., Kanazawa, A., Lassner, C., Gehler, P., Romero, J. and Black, M. J., "Keep it SMPL: Automatic Estimation of 3D Human Pose and Shape from a Single Image," In European Conference on Computer Vision (ECCV), 2016, 21 pages, https://arxiv.org/pdf/1607.08128v1.pdf.
Boisvert, J., Shu, C., Wuhrer, S., and Xi, P., "Three-Dimensional Human Shape Inference from Silhouettes: Reconstruction and Validation," Machine Vision and Applications, 24(1):145-157, 2013, 13 pages, http://people.scs.carleton.ca/~c_shu/Publications/silhouettes_human_rec_MVA11.pdf.
Bukar et al., "Automatic age and gender classification using supervised appearance model," Journal of Electronic Imaging, Aug. 2016; 25(6):0601605, 12 pages.
Chen, W., Wang, H., Li, Y., Su, H., Wang, Z., Tu, C., Lischinski, D., Cohen-Or, D. and Chen, B. Synthesizing Training Images for Boosting Human 3D Pose Estimation. In 2016 Fourth International Conference on 3D Vision (3DV) Oct. 25, 2016 (pp. 479-488). IEEE, 10 pages.
Chen, X., Guo, Y., Zhou, B. and Zhao, Q., "Deformable Model for Estimating Clothing and Naked Human Shapes from a Single Image," The Visual Computer, 29(11):1187-1196, 2013, 10 pages.
Chen, Y., Kim, T.-K. and Cipolla, R., "Inferring 3D Shapes and Deformations from Single Views," In European Conference on Computer Vision, 2010, 14 pages.
Chen, Y., Kim, T.-K. and Cipolla, R., Silhouette-Based Object Phenotype Recognition Using 3D Shape Priors. In Inter-national Conference on Computer Vision (ICCV), 2011, 8 pages.
Devries, T. and Taylor, G. W., Learning Confidence for Out-of-Distribution Detection in Neural Networks, arXiv preprint arXiv:1802.04865, 2018, 12 pages.
Dibra, E., Jain, H., Öztireli, C., Ziegler, R. and Gross, M., "HSNets: Estimating Human Body Shape from Silhouettes with Convolutional Neural Networks," In International Conference on 3D Vision (3DV), 2016, 10 pages.
Dibra, E., Jain, H., Öztireli, C., Ziegler, R. and Gross, M., "Human Shape from Silhouettes Using Generative HKS Descriptors and Cross-Modal Neural Networks," In IEEE Conference on Computer Vision and Pattern Recognition (CVPR), 2017, 11 pages.
Dibra, E., Jain, H., Öztireli, C., Ziegler, R. and Gross, M., "Shape from Selfies: Human Body Shape Estimation Using CCA Regression Forests," In European Converence on Computer Vision (ECCV), 2016, 17 pages.
Gilbert, A., Volino, M., Collomosse, J. and Hilton, A.,"Volumetric Performance Capture from Minimal Camera View-Points," In European Conference on Computer Vision, 2018, 16 pages.
Gong, K., Liang, X., Zhang, D., Shen, X. and Lin, L., "Look into Person: Self-Supervised Structure-Sensitive Learning and a New Benchmark for Human Parsing," In IEEE Conference on Computer Vision and Pattern Recognition (CVPR), 2017, 9 pages.
Guan, P., Weiss, A., Bălan, A. O. and Black, M. J., "Estimating Human Shape and Pose from a Single Image," In IEEE International Conference on Computer Vision (ICCV), 2009, 8 pages.
Güler, R. A., Neverova, N. and Kokkinos, I., "DensePose: Dense Human Pose Estimation in the Wild," In IEEE Conference on Computer Vision and Pattern Recognition (CVPR), 2018, 10 pages.
He, K., Zhang, X., Ren, S. and Sun, J., "Deep Residual Learning for Image Recognition," In IEEE Conference on Computer Vision and Pattern Recognition (CVPR), 2016, 9 pages.
Hirano, D., Funayama, Y. and Maekawa, T. 3D Shape Reconstruction From 2D Images. Computer-Aided Design and Applications. 2009 CAD Solutions, LLC. Jan. 1, 2009 ;6(5):701-10, 10 pages.
Horprasert, T., Harwood, D. and Davis, L. S., "A Statistical Approach for Real-Time Robust Background Subtraction and Shadow Detection," In IEEE International Conference on Computer Vision (ICCV), 1999, 19 pages.

Joo, H., Simon, T. and Y. Sheikh, Y., "Total Capture: A 3D Deformation Model for Tracking Faces, Hands, and Bodies," In IEEE Conference on Computer Vision and Pattern Recognition (CVPR), 2018, 10 pages.
Kanazawa, A., Black, M. J., Jacobs, D. W. and Malik, J., "End-to-End Recovery of Human Shape and Pose," In IEEE Conference on Computer Vision and Pattern Recognition (CVPR), 2018, 10 pages.
Krasin, I., Duerig, T., Alldrin, N., Ferrari, V., Abu-El-Haija, S., Kuznetsova, A., Rom, H., Uijlings, J., Popov, S., Kamali, S., Malloci, M., Pont-Tuset, J., Veit, A., Belongie, S., Gomes, V., Gupta, A., Sun, C., Chechik, G., Cai, D., Feng, Z., Narayanan, D., and Murphy, K., "Openimages: A Public Dataset for Large-Scale Multi-Label and Multi-Class Image Classification," Dataset available from https://storage.googleapis.com/openimages/web/index.html, 2017.
Kundu, A., Li, Y. and Rehg, J. M., "3D-RCNN: Instance-Level 3D Object Reconstruction via Render-and-Compare," In IEEE Conference on Computer Vision and Pattern Recognition (CVPR), 2018, 10 pages.
Lassner, C., Romero, J., Kiefel, M., Bogo, F., Black, M. J. and Gehler, P. V., "Unite the People—Closing the Loop Between 3D and 2D Human Representations," In IEEE Conference on Computer Vision and Pattern Recognition (CVPR), 2017, 10 pages.
Li, K., R. Garg, M. Cai and I. Reid, "Single-view Object Shape Reconstruction Using Deep Shape Prior and Silhouette," The School of Computer Science, University of Adelaide and Australian Centre for Robotic Vision. Adelaide, Australia, arXiv preprint arXiv: 1811.11921. Aug. 1, 2019, Cornell University, URL: https://arxiv.org/pdf/1811.11921.pdf, 14 pages.
Long, J., Shelhamer, E., and Darrell, T., "Fully Convolutional Networks for Semantic Segmentation,"0 In IEEE Conference on Computer Vision and Pattern Recognition (CVPR), 2015, 10 pages.
Loper, M., Mahmood, N., Romero, J., Pons-Moll, G. and Black, M. J., "SMPL: A Skinned Multi-Person Linear Model," ACM Trans. Graphics (Proc. SIGGRAPH Asia), 34(6):248:1-248:16, Oct. 2015, 16 pages.
Mülayim, A. Y., Yilmaz, U. and Atalay, V. Silhouette-based 3D Model Reconstruction from Multiple Images. IEEE Transactions on Systems, Man, and Cybernetics, Part B (Cybernetics). Jul. 22, 2003;33(4):582-91, 27 pages.
nakedlabs.com, Aug. 2, 2018 (Aug. 2, 2018), XP002801423, URL: https://web.archive.org/web/20180802014000/https://nakedlabs.com/ [Retrieved from the Internet: Dec. 16, 2020]; the whole document.
Ngiam, J., Khosla, A., Kim, M., Nam, J., Lee, H.and Ng, A. Y., "Multimodal Deep Learning," In International Conference on Machine Learning (ICML), pp. 689-696, 2011, 8 pages.
Nguyen et al., "Gender Recognition from Human-Body Images Using Visible-Light and Thermal Camera Videos Based on a Convolutional Neural Network for Image Feature Extraction," Sensors,Mar. 2017:17(3);637, 22 pages.
Omran, M., Lassner, C., Pons-Moll, G., Gehler, P. V. and Schiele, B., "Neural Body Fitting: Unifying Deep Learning and Model-Based Human Pose and Shape Estimation," In International Conference on 3D Vision (3DV), 2018, 14 pages.
Park, S., Hwang, J. and Kwak, N. 3D Human Pose Estimation Using Convolutional Neural Networks with 2D Pose Information. In European Conference on Computer Vision, Sep. 8, 2016 (pp. 156-169), https://arxiv.org/pdf/1608.03075v2.pdf, 15 pages.
Pavlakos et al., "Expressive Body Capture: 3D Hands, Face, and Body from a Single Image," 2019 IEEE/CVF Conference on Computer Vision and Pattern Recognition (CVPR), Jun. 1, 2019, 11 pages.
Pavlakos, G., Zhu, L., Zhou, X. and Daniilidis, K., "Learning to Estimate 3D Human Pose and Shape from a Single Color Image," In IEEE Conference on Computer Vision and Pattern Recognition (CVPR), 2018, 10 pages.
Popa, A.-I., Zanfir, M. and C. Sminchisescu, C., "Deep Multitask Architecture for Integrated 2D and 3D Human Sensing," In IEEE Conference on Computer Vision and Pattern Recognition (CVPR), 2017, 10 pages.
Rhodin, H., Robertini, N., Casas, D., Richardt, C., Seidel, H.-P. and Theobalt, C., "General Automatic Human Shape and Motion Cap-

(56) References Cited

OTHER PUBLICATIONS ture Using Volumetric Contour Cues," In European Conference on Computer Vision, 2016, 18 pages.
Robinette, K. M., Blackwell, S., Daanen, H., Boehmer, M., Fleming, S., Brill, T., Hoeferlin, D. and Burnsides, D., "Civilian American and European Surface Anthropometry Resource (CAESAR) Final Report," Tech. Rep. AFRL-HEWP-TR-2002-0169, US Air Force Research Laboratory, 2002, 70 pages.
Rogez, G., Weinzaepfel, P. and Schmid C. LCR-Net++: Multi-Person 2D and 3D Pose Detection in Natural Images. IEEE IEEE Transactions on Pattern Analysis and Machine Intelligence, Jan. 14, 2019;42(5): 1146-61, Downloaded on Jul. 18, 2020, 16 pages.
Sigal, L., Bălan, A. O. and Black, M. J., "Combined Discriminative and Generative Articulated Pose and Non-Rigid Shape Estimation," In Neural Information Processing Systems (NIPS), 2007, 8 pages.
Su et al., "Multi-view Convolutional Neural Networks for 3D Shape Recognition," 2015 IEEE International Conference on Computer Vision (ICCV), Dec. 7-13, 2015, Santiago, Chile, 9 pages.
Sun, J., Ovsjanikov, M. and Guibas, L., "A Concise and Provably Informative Multi-Scale Signature Based on Heat Diffusion," In Symposium on Geometry Processing, 2009, 10 pages.
Sun, X., Wu, J., Zhang, X., Zhang, Z., Zhang, C., Xue, T., Tenenbaum, J. B. and Freeman, W. T. Pix3D: Dataset and Methods for Single-Image 3D Shape Modeling. In 2018 IEEE/CVF Conference on Computer Vision and Pattern Recognition, Jun. 18, 2018 (pp. 2974-2983). IEEE, 10 pages.
Tan, J. K. V., Budvytis, I. and Cipolla, R., "Indirect Deep Structured Learning for 3D Human Body Shape and Pose Prediction," In British Machine Vision Conference, 2017, 11 pages.
TC2 Labs LLC, "SizeUSA", 3 pages, http://scan2fit.com/sizeusa/about.php.
Pradhan, L., et al., Feature Extraction from 2D Images for Body Composition Analysis, 2015 IEEE 978-1-5090-0379-2/15, DOI 10.1109/ ISM.2015.117, pp. 45-52. (Year: 2015).
Ji, Z., et al.; "Human Body Shape Reconstruction from Binary Silhouette Images;" Computer Aided Geometric Design 71 (2019) pp. 231-243; Elsevier B.V. (Year: 2019).
Hassan B, Izquierdo E and Piatrik T. Soft Biometrics: A Survey Benchmark Analysis, Open Challenges and Recommendations. Multimedia Tools and Applications. Mar. 2, 2021, 44 pages.
Kolotouros, N. et al. "Learning to Reconstruct 3D Human Pose and Shape via Model-fitting in the Loop," In Proceedings of the IEEE International Conference on Computer Vision, 2019, Sep. 27, 2019, URL: https://arxiv.org/abs/1909.12828, 10 pages.
Nambiar A, Bernardino A and Nascimento J. Shape Context for Soft Biometrics in Person Re-Identification and Database Retrieval. Pattern Recognition Letters. Dec. 15, 2015; 68:297-305.
Ramanathan V and Wechsler H. Robust Human Authentication Using Appearance and Holistic Anthropometric Features. Pattern Recognition Letters. Nov. 1, 2010; 31(15):2425-35.
Sengupta, A. et al. "Hierarchical Kinematic Probability Distributions for 3D Human Shape and Pose Estimation from Images in the Wild," In International Conference on Computer Vision, Oct. 2021, URL: https://www.researchgate.net/publication/355060401_Hierarchical_Kinematic_Probability_Distributions_for_3D_Human_Shape_and_Pose_Estimation_from_Images_in_the_Wild, 17 pages.
Sengupta, A. et al. "Synthetic Training for Accurate 3D Human Pose and Shape Estimation in the Wild," In British Machine Vision Conference (BMVC), Sep. 2020, URL: https://www.researchgate.net/publication/344335326_Synthetic_Training_for_Accurate_3D_Human_Pose_and_Shape_Estimation_in_the_Wild, 13 pages.
Varol G, Ceylan D, Russell B, Yang J, Yumer E, Laptev I and Schmid C. Bodynet: Volumetric Inference of 3D Human Body Shapes (and Supplemental Material). In Proceedings of the European Conference on Computer Vision (ECCV) 2018 (pp. 20-36).
Dibra, Endri: "Recovery of the 3D Virtual Human: Monocular Estimation of 3D Shape and Pose with Data Driven Priors", May 31, 2018 (May 31, 2018), pp. 1-192, XP055648769, DOI: 10.3929/ethz-b-000266852 Retrieved from the Internet: URL: https://www.research-collection.ethz.ch/bitstream/handle/20.500.11850/266852/Endri_Dibra_Thesis_Final.pdf?sequence=3&isAllowed=y [retrieved on Dec. 3, 2019].
Huang Z, Barrett JS, Barrett K, Barrett R, Ng CM. Novel method to predict body weight in children based on age and morphological facial features. The Journal of Clinical Pharmacology. Apr. 2015;55(4):447-51.
Kocabey E, Camurcu M, Ofli F, Aytar Y, Marin J, Torralba A, Weber I. Face-to-BMI: Using computer vision to infer body mass index on social media. In Proceedings of the International AAAI Conference on Web and Social Media May 3, 2017 (vol. 11, No. 1, pp. 572-575).
Lee BJ, Jang JS, Kim JY. Prediction of body mass index from facial features of females and males. International Journal of Bio-Science and Bio-Technology. Sep. 2012;4(3):45-62.
Lee BJ, Kim JY. Predicting visceral obesity based on facial characteristics. BMC Complementary and Alternative Medicine. Dec. 2014;14(1):1-9.
Smith, Brandon M. et al: "Towards Accurate 3D Human Body Reconstruction from Silhouettes", 2019 International Conference on 3D Vision (3DV), IEEE, Sep. 16, 2019 (Sep. 16, 2019), pp. 279-288 , XP033653362, DOI: 10.1109/3DV.2019.00039 [retrieved on Oct. 28, 2019].
Yan, Song et al: "Learning Anthropometry from Rendered Humans", arxiv.org, Cornell University Library, 201 Online Library Cornell University Ithaca, NY, 14853, Jan. 7, 2021 (Jan. 7, 2021), XP081853690.
Kato H, Ushiku Y, Harada T. Neural 3D Mesh Renderer. In Proceedings of the IEEE Conference on Computer Vision and Pattern Recognition 2018 (pp. 3907-3916).
Natsume R, Saito S, Huang Z, Chen W, Ma C, Li H, Morishima S. SiCloPe: Silhouette-Based Clothed People. arXiv preprint arXiv: 1901.00049. Dec. 31, 2018.
Dibra Endri et al: "HS-Nets: Estimating Human Body Shape from Silhouettes with Convolutional Neural Networks", 2016 Fourth International Conference on 3D Vision (30V), IEEE, Oct. 25, 2016 (Oct. 25, 2016), pp. 108-117, XP033027616, DOI: 10.1109/3DV.2016.19 [retrieved on Dec. 15, 2016].

* cited by examiner

THREE-DIMENSIONAL BODY COMPOSITION FROM TWO-DIMENSIONAL IMAGES OF A PORTION OF A BODY

BACKGROUND

Three-dimensional modeling of the human body currently requires large or expensive sensors, such as stereo imaging elements, three-dimensional scanners, depth sensing devices, etc.

DETAILED DESCRIPTION

Figure 1A:
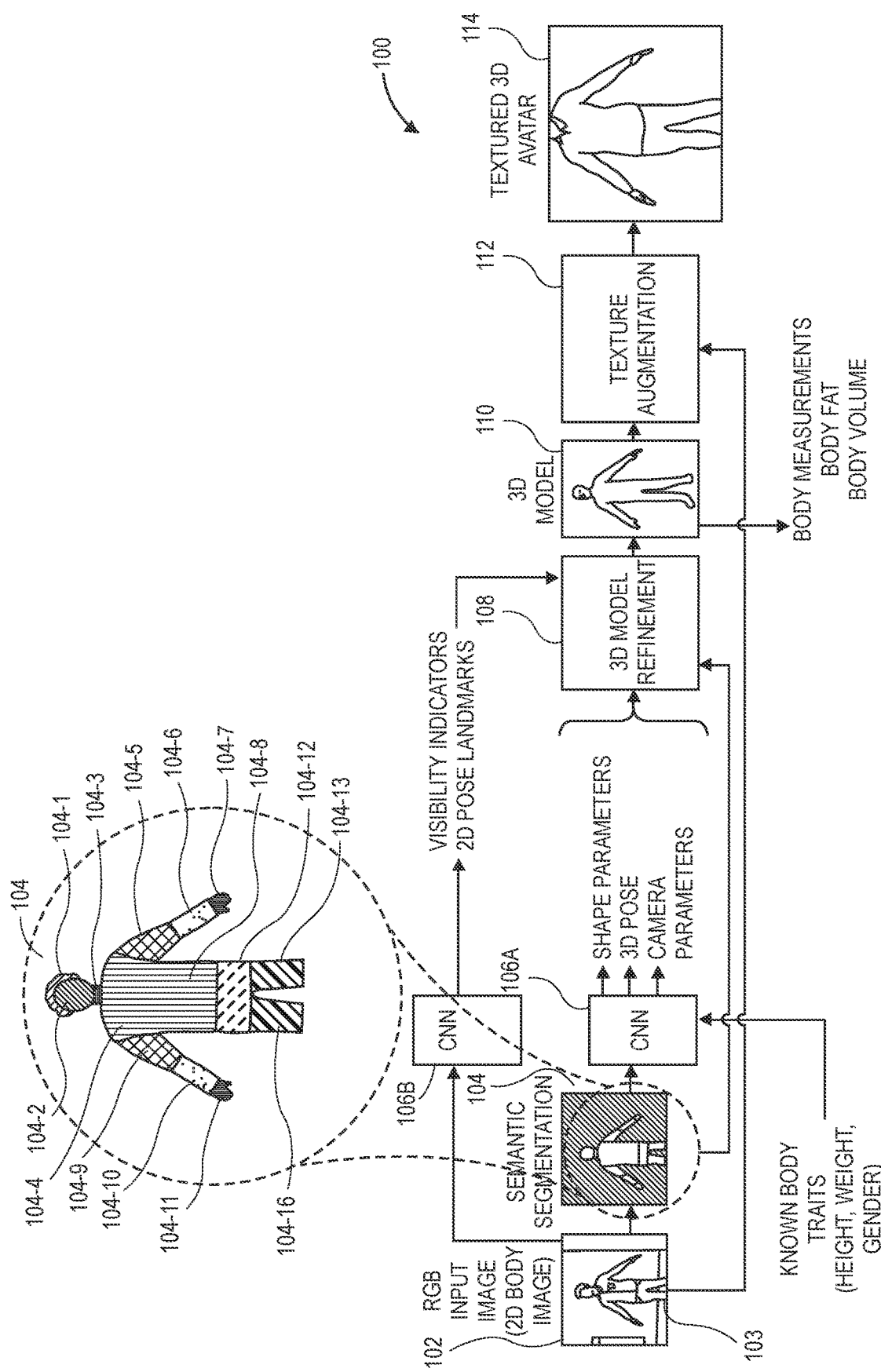
FIG. 1A is a transition diagram of processing two-dimensional body images to produce a dimensionally accurate three-dimensional model of that body, in accordance with implementations of the present disclosure.

As is set forth in greater detail below, implementations of the present disclosure are directed to generation of a dimensionally accurate three-dimensional ("3D") model of a body, such as a human body, based on two-dimensional ("2D") images of at least a portion of that body, referred to herein as a 2D body image. The term 2D body image, as used herein, refers to both 2D body images that include a representation of an entire body of a user as well as 2D body images that include a representation of only a portion of the 2D body (i.e., less than the entire body of the user). A 2D partial body image, as used herein, refers specifically to 2D images that include a representation of less than the entire body of the user.

In some implementations, a user, also referred to herein as a person, may use a 2D camera, such as a digital camera typically included in many of today's portable devices (e.g., cell phones, tablets, laptops, etc.) and obtain a series of 2D body images of their body from different views with respect to the camera. For example, the camera may be stationary, and the user may position themselves in a front view facing toward the camera and the camera may obtain one or more front view images of the body of the user. The user may then turn approximately ninety degrees to the right to a first side view facing the camera, and the camera may obtain one or more first side view images of the body of the user. The user may then turn approximately ninety degrees to the right to a back view facing the camera, and the camera may obtain one or more back view images of the body of the user. The user may then turn approximately ninety degrees to the right to a second side view facing the camera, and the camera may obtain one or more second side view images of the body of the user. As discussed further below, any number of body orientations with respect to the camera and corresponding images thereof may be obtained and used with the disclosed implementations.

As noted above, only a portion of the body need be visible and represented in the images. For example, the disclosed implementations may utilize images in which a portion of the body, such as the lower legs and feet, hands, and/or head are not represented in the image and/or are occluded by other objects represented in the image. Such 2D partial body images may be produced, for example, if the user is positioned such that a portion of the body of the user is outside the field of view of the camera. In other examples, if another object (e.g., table, desk) is between a portion of the body of the user and the camera, a 2D partial body image may be produced in which less than all of the body of the user is represented in the image. In still other examples, the position of the body of the user, such as kneeling, sitting, etc., when the images are generated may result in one or more 2D partial body images.

Two-dimensional body images of the different views of the body of the user may then be processed using one or more processing techniques, as discussed further below, to generate a plurality of predicted body parameters corresponding to the body of the user represented in the images. Those predicted body parameters may then be further processed, as discussed below, to generate a dimensionally accurate 3D model or avatar of the body of the user. In some implementations, the generated 3D model may be further adjusted to match the shape and/or size of the body of the user as represented in one or more of the original 2D body images. Likewise, or in addition thereto, in some implementations, one or more textures (e.g., skin color, clothing, hair, facial features, etc.) may be determined from the original 2D body images and used to augment the 3D model of the user, thereby generating a dimensionally accurate and visually similar 3D model of the user.

As discussed herein, the disclosed implementations may utilize one or more 2D partial body images and produce a full 3D model of the user represented in the 2D partial body images. The produced 3D model may include both a 3D model representation of visible segments of the body of the user represented in the image as well as segments of the body of the user that are not visible in the 2D body image.

The resulting dimensionally accurate 3D model of a body of a user may be utilized for a variety of purposes. For example, it may be presented to a user via an application executing on the same device as used to capture the 2D body images that were processed to generate the 3D model. With the application and the 3D model of the body of the user, the user can track changes to their body, determine body dimensions, measure portions of their body (e.g., arms, waist, shoulders, etc.), determine body mass, body volume, body fat, predict what they would look like if they gained muscle, lost fat, etc.

FIG. 1A is a transition diagram 100 of processing 2D body images of a body to produce a dimensionally accurate 3D model of that body, in accordance with implementations of the present disclosure.

3D modeling of a body from 2D body images begins with the receipt or creation of a 2D body image 102 that includes a representation of at least a portion of the body 103 of the user to be modeled. 2D body images 102 for use with the disclosed implementations may be generated using any conventional imaging element, such as a standard 2D Red, Green, Blue ("RGB") digital camera that is included on many current portable devices (e.g., tablets, cellular phones, laptops, etc.). The 2D body image may be a still image generated by the imaging element or an image extracted from video generated by the imaging element. Likewise, any number of images may be used with the disclosed implementations.

In some implementations, the user may be instructed to stand in a particular orientation (e.g., front facing toward the imaging element, side facing toward the imaging element, back facing toward the imaging element, etc.) and/or to stand in a particular pose, such as the "A" pose as illustrated in image 102. Likewise, the user may be instructed to stand a distance from the camera such that the body of the user, or at least a portion thereof (such as the torso), is included in a field of view of the imaging element and represented in the generated image 102. Still further, in some implementations, the imaging element may be aligned or positioned at a fixed or stationary point and at a fixed or stationary angle so that images generated by the imaging element are each from the same perspective and encompass the same field of view. In the illustrated example, the user is positioned such that a lower portion of the body of the user is outside the field of view of the camera and therefore not represented in the image 102.

As will be appreciated, a user may elect or opt-in to having a 3D model of the body of the user generated and may also select whether the generated 3D model and/or other information may be used for further training of the disclosed implementations and/or for other purposes.

The 2D body image 102 that includes a representation of at least a portion of the body 103 of the user may then be processed to produce a segmented silhouette 104 of the body 103 of the user represented in the image 102. A variety of techniques may be used to generate the segmented silhouette 104. For example, background subtraction may be used to subtract or black out pixels of the image that correspond to a background of the image while pixels corresponding to the body 103 of user (i.e., foreground) may be assigned a white or other color values. In another example, a semantic segmentation algorithm may be utilized to label background and body (foreground) pixels. For example, a convolutional neural network ("CNN") may be trained with a semantic segmentation algorithm to determine bodies, such as human bodies, in images.

In addition or as an alternative thereto, the segmented silhouette may be segmented into one or more body segments, such as hair segment 104-1, head segment 104-2, neck segment 104-3, upper clothing segment 104-4, upper left arm 104-5, lower left arm 104-6, left hand 104-7, torso 104-8, upper right arm 104-9, lower right arm 104-10, right hand 104-11, lower clothing 104-12, upper left leg 104-13, upper right leg 104-16, etc. For example, the CNN may be trained with a semantic segmentation algorithm to predict for each pixel of an image the likelihood that the pixel corresponds to a segment label (e.g., hair, upper clothing, lower clothing, head, upper right arm, etc.). For example, the CNN may be trained to process each 2D body image and output, for each pixel of each image, a vector that indicates a probability for each label that the pixel corresponds to that label. For example, if there are twenty three labels (e.g., body segments) for which the CNN is trained, the CNN may generate, for each pixel of a 2D image, a vector that includes a probability score for each of the twenty-three labels indicating the likelihood that the pixel corresponds to the respective label. As a result, each pixel of an image may be associated with a segment based on the probability scores indicated in the vector. For segments for which the CNN is trained but are not represented in the 2D image, the CNN will provide low or zero probability scores for each label indicated in the vector, thereby indicating that the segment is not visible in the 2D body image. As discussed, a segment may be determined by the CNN to not be visible if it is outside the view of the camera and therefore not represented in the 2D image or if another object is between the body segment and the camera such that the body segmented is occluded in the 2D image and therefore not visible. Likewise, for pixels that are determined to not correspond to one of the labels, those pixels may be labeled as background segments.

In some implementations, the segmented silhouette of the body of the user may be normalized in height and centered in the image, as discussed further below. This may be done to further simplify and standardize inputs to a CNN to those on which the CNN was trained. Likewise, a segmented silhouette of the body of the user may be preferred over the representation of the body of the user so that the CNN can focus only on body shape and each respective segment, and not skin tone, texture, clothing, etc.

The segmented silhouette 104 of the body may then be processed by one or more other CNNs 106 that are trained to determine body traits, also referred to herein as body features, representative of the body, determine if the entire body is represented in the image or if a portion of the body is outside the image or occluded by another object in the image, and to produce predicted body parameters that are used to generate a 3D model of the body. In some implementations, the CNN 106 may be trained for multi-mode input to receive as inputs to the CNN the segmented silhouette 104, and one or more known body attributes 105 of the body of the user. For example, a user may provide a height of the body of the user, a weight of the body of the user, a gender of the body of the user, etc., and the CNN may receive one or more of those provided attributes as an input.

In one example, based on the received inputs, a first CNN 106A generates predicted body parameters, such as body volume, shape of the body, pose angles, etc. Likewise, a second CNN 106B may receive the 2D body image 103 and/or the segmented silhouette 104 and determine 2D landmarks (e.g., x, y positions in the 2D body image) and/or visibility indicators for each 2D landmark of the body, indicating a likelihood that the 2D landmark is visible in the image (rather than beyond the image or occluded in the image by another object).

In some implementations, the CNN(s) 106 may be trained to predict hundreds of body parameters of the body represented in the image 102. For example, any number of 2D landmarks, such as top of head, ears, left shoulder, right shoulder, right elbow, left elbow, right wrist, left wrist, left hip, right hip, left knee, right knee, left ankle, right ankle, may be determined in accordance with the disclosed implementations. In such implementations, a visibility indicator may also be determined for each 2D landmark. The visibility indicator for each 2D landmark may be determined based on, for example, the position of the body segment(s) that connect to the 2D landmark, the position of other body segments and/or other 2D landmarks, etc. As discussed further below, because the CNN may generate data for each 2D landmark of the body, regardless of whether the 2D landmark is visible, the visibility indicator may be utilized with the disclosed implementations to improve the accuracy of 3D model rendering.

Figure 1B:
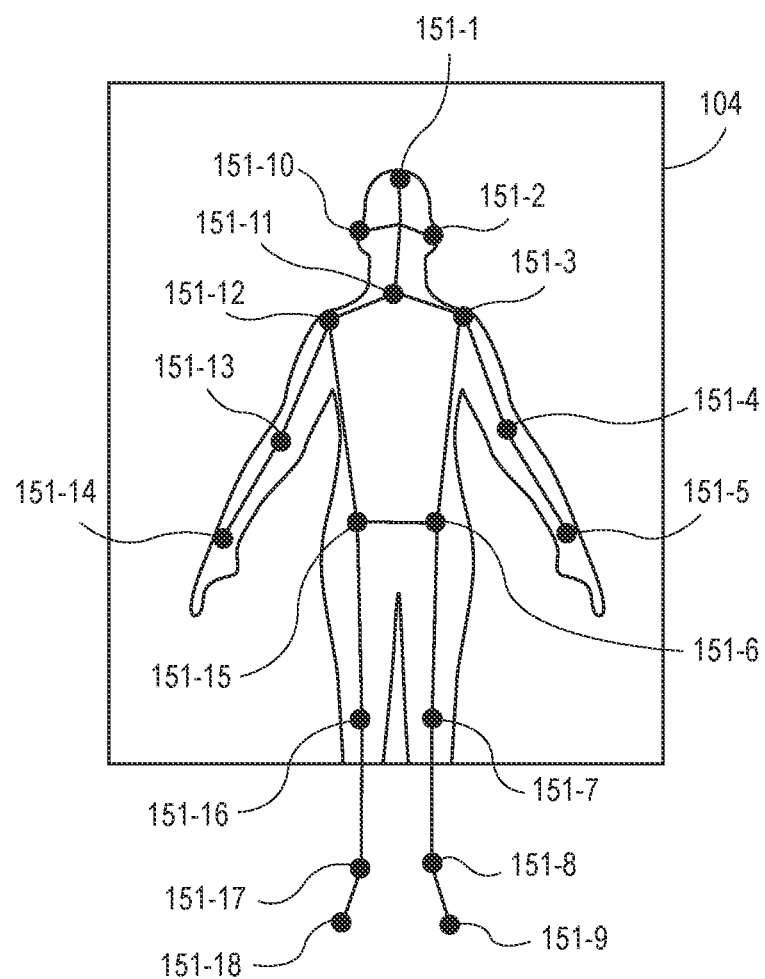
FIG. 1B is a diagram of an image of a body of a user with 2D landmarks indicated both inside and outside of the image, in accordance with implementations of the present disclosure.

FIG. 1B is a diagram of an image 104 of a body of a user with 2D landmarks 151 indicated both inside and outside of the image, in accordance with implementations of the present disclosure.

As discussed, the 2D body image or segmented silhouette of the 2D body image may be processed to determine 2D landmarks 151 of the body. For example, the image 104 may be provided to a trained machine learning model, such as a CNN that is trained to determine 2D landmarks of a body represented in an image. Based on the provided input, the CNN may generate an output indicating the location (e.g., x, y coordinates, or pixels) corresponding to the 2D landmarks for which the CNN was trained. In the illustrated example, the CNN may indicate 2D landmarks for the top of head 151-1, left ear 151-2, left shoulder 151-3, left elbow 151-4, left wrist 151-5, left hip 151-6, left knee 151-7, right ear 151-10, neck 151-11, right shoulder 151-12, right elbow 151-13, right wrist 151-14, right hip 151-15, and right knee 151-16, all of which are visible in the image 154. Likewise, in some implementations, the CNN may also infer the location of 2D landmarks that are not visible in the image 154, such as the left ankle 151-8, left foot 151-9, right ankle 151-16, and right foot 151-18. Such inference may not only indicate the inferred location of the 2D landmarks that are not visible but also indicate, such as through a visibility indicator, that the inferred positions of the 2D landmarks are determined to not be visible in the input image 104. Likewise, in some implementations, the CNN may provide a visibility indicator for 2D landmarks that are determined to be visible in the input image indicating that the 2D landmarks are visible.

Utilizing the predicted body parameters and visibility indicators, a 3D model of the body is generated. For example, the body parameters may be provided to a body model, such as the Shape Completion and Animation of People ("SCAPE") body model, a Skinned Multi-Person Linear ("SMPL") body model, etc., and the body model may generate the 3D model of the body of the user based on those predicted body parameters. To improve accuracy of the 3D model, in some implementations, data corresponding to any 2D landmark that is determined to not be visible, as indicated by the respective visibility indicator, may be ignored or omitted by the body model in generation of the 3D model as the data for those landmark body parameters may be unreliable or inaccurate. Instead, the model may determine 2D landmarks for those non-visible body joints based on the position of other body joints of the body of the user that are visible. In other implementations, the inferred position for one or more 2D landmarks that are determined to not be visible, such as those that are within the field of view of the image but occluded, may be considered in determining the 3D model.

In some implementations, as discussed further below, 3D model refinement 108 may be performed to refine or revise the generated 3D model to better represent the body of the user. Initially, for each 2D landmark determined to be visible in the image, as indicated by the corresponding visibility indicator, the position of the 2D landmark as represented in the 3D model may be compared with the representation of the body 103 of the user in the 2D image 102 to determine differences therebetween. The determined 2D landmarks may be updated to align the determined 2D landmarks that are used to generate the 3D model with the position of those 2D landmarks as represented in the 2D body image 102.

In addition to aligning the 2D landmarks, 3D model refinement 108 may process each body segment of the 3D body model with respect to the corresponding segment as specified in the segmented silhouette. For example, each body segment of the 3D body model may be compared with each segment of the segmented silhouette. An error or difference between each body segment comparison may be determined and one or more of the body segments as represented in the 3D model may be adjusted to correct for the error. The adjustments and comparisons may be done in an iterative fashion until there is no or little difference between the shape of the body 103 of the user represented in the image 102 and the shape of the 3D model 110. For example, the segmented silhouette and the 3D model may be provided to a machine learning system, such as PYTORCH, and the body segments of the 3D model may be adjusted based on an iterative comparison of each body segment of the 3D model with the body segments of the segmented silhouette. For body segments that are not visible, the body segment size, shape, and position may be generated or determined based on the position of other body segments and/or 2D landmarks of the body that are visible in the 2D image from which the 3D model was generated. Likewise, those body segments may be adjusted or updated as part of the iterative processing and refinement of the visible body segments.

Still further, in some implementations, the 3D model 110 of the body of the user may be augmented with one or more textures, texture augmentation 112, determined from the image 102 of the body of the user. For example, the 3D model may be augmented to have a same or similar color to a skin color of the body 103 represented in the image 102, clothing or clothing colors represented in the image 102 may be used to augment the 3D model, facial features, hair, hair color, etc., of the body of the user represented in the image 102 may be determined and used to augment the 3D model, etc. As discussed below, for body segments that are not visible, as indicated by the visibility indicator, the texture may be predicted based on textures of adjacent body segments and applied to the 3D body model.

The result of the processing illustrated in the transition 100 is a dimensionally accurate 3D model 114, or avatar representative of the body of the user, that has been generated from 2D body images of the body of the user. As discussed herein, some or all of the portions of the 2D body that are not visible in the 2D images may be generated and included in the 3D body model.

Figure 2A:
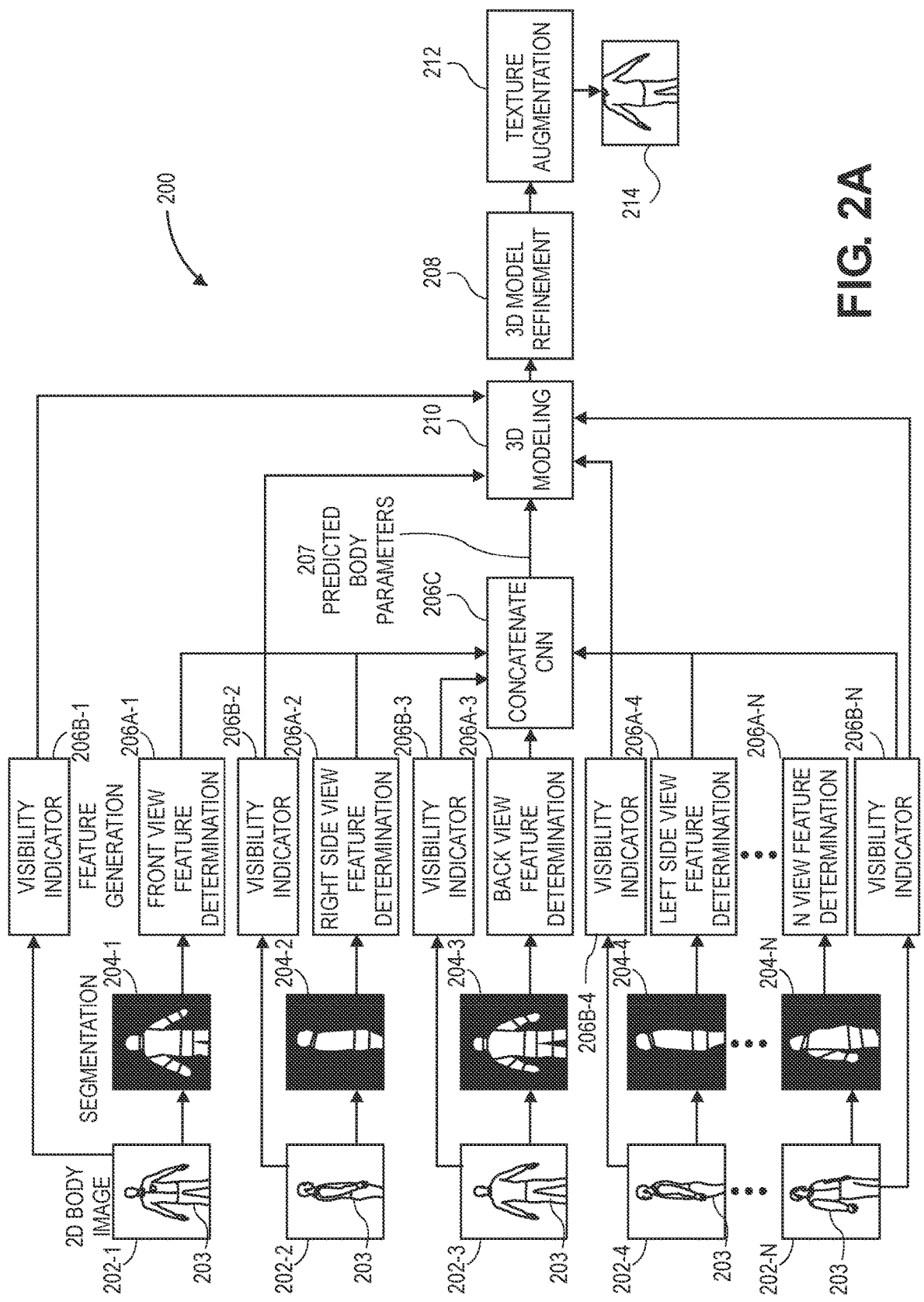
FIG. 2A is another transition diagram of processing two-dimensional body images to produce a dimensionally accurate three-dimensional model of that body, in accordance with implementations of the present disclosure.

FIG. 2A is another transition diagram 200 of processing 2D body images 202 of a body to produce a dimensionally accurate three-dimensional model of that body, in accordance with implementations of the present disclosure.

In some implementations, multiple 2D body images of at least a portion of a body from different views (e.g., front view, side view, back view, three-quarter view, etc.), such as 2D body images 202-1, 202-2, 202-3, 202-4 through 202-N may be utilized with the disclosed implementations to generate a dimensionally accurate 3D model of the body. In the illustrated example, the first 2D body image 202-1 is an image of at least a portion of a human body 203 oriented in a front view facing a 2D imaging element. The second 2D body image 202-2 is an image of at least a portion of the human body 203 oriented in a first side view facing the 2D imaging element. The third 2D body image 202-3 is an image of at least a portion of the human body 203 oriented in a back view facing the 2D imaging element. The fourth 2D body image 202-4 is an image of at least a portion of the human body 203 oriented in a second side view facing the 2D imaging element. As will be appreciated, any number of 2D body images 202-1 through 202-N may be generated with the view of at least a portion of the human body 203 in any number of orientations with respect to the 2D imaging element. In some implementations, some of the 2D body images may be 2D partial body images while other 2D body images include a full representation of the body of the user.

Each of the 2D body images 202-1 through 202-N are processed to segment pixels of the image to different body segments (or to background) to produce a segmented silhouette 204 of the human body as represented in that image. Segmentation may be done as discussed above with respect to FIG. 1A. For example, a CNN utilizing a semantic segmentation algorithm may be trained using images of human bodies, or simulated human bodies, to train the CNN to distinguish between pixels that represent different body segments of human bodies. In such an example, the CNN may process the image 202 and indicate or label pixels that represent different body segments (head, hair, upper right arm, lower left leg, etc.), as well as pixels that do not represent a human body part, such as background or other objects represented in the image. Each pixel may be assigned a vector that indicates a probability score for each label as to whether the pixel corresponds to the labeled body segment.

In other implementations, other forms or algorithms, such as edge detection, shape detection, etc., may be used to determine pixels of the image 202 that represent different body segments of the user.

Returning to FIG. 2A, the first 2D body image 202-1 is processed to segment a plurality of pixels of the first 2D body image 202-1 into different body segments, to produce a front segmented silhouette 204-1 of the human body. The second 2D body image 202-2 is processed to segment a plurality of pixels of the second 2D body image 202-2 into different body segments, to produce a first side segmented silhouette 204-2 of the human body. The third 2D body image 202-3 is processed to segment a plurality of pixels of the third 2D body image 202-3 into different body segments, to produce a back segmented silhouette 204-3 of the human body. The fourth 2D body image 202-4 is processed to segment a plurality of pixels of the fourth 2D body image 202-4 into different body segments, to produce a second side segmented silhouette 204-4 of the human body. Processing of the 2D body images 202-1 through 202-N to produce segmented silhouettes 204-1 through 204-N from different orientations of the human body 203 may be performed for any number of images 202.

In some implementations, in addition to generating a segmented silhouette 204 from the 2D body image, the segmented silhouette may be normalized in size and centered in the image. For example, the segmented silhouette may be cropped by computing a bounding rectangle around the segmented silhouette 204. The segmented silhouette 204 may then be resized according to s, which is a function of a known height h of the user represented in the 2D body image (e.g., the height may be provided by the user):

$$s = h * \frac{0.8 * image_h}{\mu_h} \quad (1)$$

Where $image_h$ is the input image height, which may be based on the pixels of the image, and $\mu_h$ is the average height of a person (e.g., ~160 centimeters for females; ~176 centimeters for males).

In addition to processing the 2D body images 202 to generate body segments, the 2D body images may be processed to determine visibility indicators for one or more 2D landmarks of the body. For example, the first 2D body image 202-1 may be processed by a first visibility indicator CNN 206B-1 to determine visibility indicators for each of one or more 2D landmarks, each visibility indicator indicating whether the respective landmark is visible in the first 2D body image 202-1. The second 2D body image 202-2 may be processed by a second visibility indicator CNN 206B-2 to determine visibility indicators for each of the one or more 2D landmarks, each visibility indicator indicating whether the respective landmark is visible in the second 2D body image 202-2. The third 2D body image 202-3 may be processed by a third visibility indicator CNN 206B-3 to determine visibility indicators for each of the one or more 2D landmarks, each visibility indicator indicating whether the respective landmark is visible in the third 2D body image 202-3. The fourth 2D body image 202-4 may be processed by a fourth visibility indicator CNN 206B-4 to determine visibility indicators for each of the one or more 2D landmarks, each visibility indicator indicating whether the respective landmark is visible in the fourth 2D body image 202-4. Processing of the 2D body images may be done for each image, through the Nth 2D body image 202-N, which may be processed by an Nth visibility indicator CNN 206B-N to determine visibility indicators for each of the one or more 2D landmarks, each visibility indicator indicating whether the respective landmark is visible in the Nth 2D body image 202-N. While the illustrated example describes each 2D body image being processed by a separate neural network to determine respective visibility indicators, in other implementations, one or more of the 2D body images 202 may be processed by the same neural network (e.g., the same CNN). The visibility indicators for each of the one or more 2D landmarks, generated by each of the visibility indicators CNNs 206B, may be provided to 3D modeling 210.

Each segmented silhouette 204 representative of the body may also be processed to determine body traits or features of the human body. Different CNNs may be trained using segmented silhouettes of bodies, such as human bodies, from different orientations with known features. In some implementations, different CNNs may be trained for different orientations. For example, a first CNN 206A-1 may be trained to determine front view features from front view segmented silhouettes 204-1. A second CNN 206A-2 may be trained to determine right side features from right side segmented silhouettes. A third CNN 206A-3 may be trained to determine back view features from back view segmented silhouettes. A fourth CNN 206A-4 may be trained to determine left side features from left side segmented silhouettes. Different CNNs 206A-1 through 206A-N may be trained for each of the different orientations of segmented silhouettes 204-1 through 204-N. Alternatively, one CNN may be trained to determine features from any orientation segmented silhouette. Likewise, CNNs may be trained based on both 2D partial body images and full 2D body images and/or partial segmented silhouettes and full segmented silhouettes. In some implementations, the same CNN may be used to determine body features and visibility indicators for one or more of the 2D body images.

In implementations that utilize multiple images of the body 203 to produce multiple sets of features, such as the example illustrated in FIG. 2A, those features may be concatenated 206C and the concatenated features processed together with a CNN to generate a set of predicted body parameters 207. For example, a CNN may be trained to receive features generated from different segmented silhouettes 204 to produce predicted body parameters 207. The predicted body parameters 207 may indicate any aspect or information related to the body 203 represented in the images 202. For example, the predicted body parameters 207 may indicate body volume, shape of the body, pose angles, etc. In some implementations, the CNN 206C may be trained to predict hundreds of body parameters 207 corresponding to the body 203 represented in the images 202.

Utilizing the predicted body parameters 207 and visibility indicators received from the one or more visibility indicator CNNs 206B, 3D modeling 210 of the body 203 represented in the 2D body images 202 is performed to generate a 3D model of the body 203 represented in the 2D body images 202. As illustrated above, the 3D model may be a full representation of the body of the user, even if the 2D body images are 2D partial body images. For example, if the input images do not include a representation of the lower leg segments and feet of the user, such as the example discussed above, the generated 3D model may include a model of the non-visible segments of the body of the user, in this example the lower leg segments and feet.

The body parameters 207 may be provided to a body model, such as the SCAPE body model, the SMPL body model, etc., and the body model may generate the 3D model of the body 203 represented in the images 202 based on those predicted body parameters 207. To improve accuracy of the 3D model, in some implementations, data corresponding to any 2D landmark that is determined to not be visible, as indicated by the respective visibility indicator, may be ignored or omitted by the body model in generation of the 3D model as the data for those landmark body parameters may be unreliable or inaccurate. Instead, the model may determine 2D landmarks for those non-visible body joints based on the position of other body joints of the body of the user that are visible.

In the illustrated example, 3D model refinement 208 may be performed to refine or revise the generated 3D model to better represent the body 203 represented in the 2D body images 202. Initially, for each 2D landmark determined to be visible in one or more of the images 202, as indicated by the corresponding visibility indicator, the position of the 2D landmark as represented in the 3D model may be compared with the representation of the body of the user in the 2D image 202 to determine differences therebetween. The determined 2D landmarks may then be updated to align the determined 2D landmarks that are used to generate the 3D model with the position of those 2D landmarks as represented in the 2D body image 202.

In addition to aligning the 2D landmarks, 3D model refinement 208 may process each body segment of the 3D body model with respect to the corresponding segment as specified in the segmented silhouette. For example, each body segment of the 3D body model may be compared with each segment of the segmented silhouette. An error or difference between each body segment comparison may be determined and one or more of the body segments as represented in the 3D model may be adjusted to correct for the error. The adjustments and comparisons may be done in an iterative fashion until there is no or little difference between the shape of the body 203 of the user represented in the image 202 and the shape of the 3D model. For example, the segmented silhouette and the 3D model may be provided to a machine learning system, such as PYTORCH, and the body segments of the 3D model may be adjusted based on an iterative comparison of each body segment of the 3D model with the visible body segments of the segmented silhouette. For body segments that are not visible, the body segment size, shape, and position may be generated or determined based on the position of other body segments and/or 2D landmarks of the body that are visible in the 2D image from which the 3D model was generated. Likewise, those body segments may be adjusted or updated as part of the iterative processing and refinement of the visible body segments.

In some implementations, the 3D model may be compared to a single image, such as image 202-1. In other implementations, the 3D model may be compared to each of the 2D body images 202-1 through 202-N in parallel or sequentially. In still other implementations, one or more 2D model images may be generated from the 3D model and those 2D model images may be compared to the segmented silhouettes and/or the 2D body images to determine differences between the 2D model images and the segmented silhouette/2D body images.

Comparing the 3D model and/or a 2D model image with a 2D body image 202 or segmented silhouette 254 may include determining an approximate pose of the body 203 represented in the 2D body image and adjusting the 3D model to the approximate pose. The 3D model or rendered 2D model image may then be overlaid or otherwise compared to the body 203 represented in the 2D body image 202 and/or represented in the segmented silhouette 204 to determine a difference between body segments of the 3D model and visible body segments of the 2D body image.

Based on the determined differences between the 3D model and the body 203 represented in the 2D body image 202, the segmented silhouette 204 generated from that image may be revised to account for those differences. For example, if body segments of the 3D model are compared with the visible body segments determined for the body 203 represented in the first image 202-1 and differences are determined, the segmented silhouette 204-1 may be revised based on those differences. Alternatively, the predicted body parameters and/or the 3D model may be revised to account for those differences.

If body segments of a segmented silhouette are revised as part of the 3D model refinement 208, the revised segmented silhouette may be processed to determine revised features for the body 203 represented in the 2D body image based on the revised segmented silhouette. The revised features may then be concatenated with the features generated from the other segmented silhouettes or with revised features generated from other revised segmented silhouettes that were produced by the 3D model refinement 208. For example, the 3D model refinement 208 may compare body segments of the generated 3D model with visible body segments of the body 203 as represented in two or more 2D body images 202, such as a front image 202-1 and a back image 202-3, differences determined for each of those images, revised segmented silhouettes generated from those differences and revised front view features and revised back view features generated. Those revised features may then be concatenated with the two side view features to produce revised predicted body model parameters. In other implementations, 3D model refinement 208 may compare the 3D model with all views of the body 203 represented in the 2D body images 202 to determine differences and generate revised segmented silhouettes for each of those 2D body images 202-1 through 202-N. Those revised segmented silhouettes may then be processed by the CNNs 206A-1 through 206A-N to produce revised features and those revised features concatenated to produce revised predicted body parameters 207. Finally, the revised predicted body parameters may be processed by 3D modeling 210 to generate a revised 3D model, with respective revised 3D body segments. This process of 3D refinement may continue until there is no or limited difference (e.g., below a threshold difference) between the body segments of the generated 3D model and the visible body segments of the body 203 represented in the 2D body images 202.

In another implementation, 3D model refinement 208 may sequentially compare body segments of the 3D model with visible body segments determined for the representations of the body 203 in the different 2D body images 202. For example, 3D model refinement 208 may compare body segments of the 3D model with visible body segments determined for a first representation of the body 203 in a first 2D body image 202-1 to determine differences that are then used to generate a revised segmented silhouette 204-1 corresponding to that first 2D body image 202-1. The revised segmented silhouette may then be processed to produce revised features and those revised features may be concatenated 206C with the features generated from the other segmented silhouettes 204-2 through 204-N to generate revised predicted body parameters, which may be used to generate a revised 3D model. The revised body segments of the revised 3D model may then be compared with visible body segments of a next image of the plurality of 2D body images 202 to determine any differences and the process repeated. This process of 3D body segment refinement may continue until there is no or limited difference (e.g., below a threshold difference) between the body segments of the generated 3D model and the visible body segments of the body 203 represented in the 2D body images 202.

In some implementations, upon completion of 3D model refinement 208, the 3D model of the body represented in the 2D body images 202 may be augmented with one or more textures, texture augmentation 212, determined from one or more of the 2D body images 202-1 through 202-N. For example, the 3D model may be augmented to have a same or similar color to a skin color of the body 203 represented the 2D body images 202, clothing or clothing colors represented in the 2D body images 202 may be used to augment the 3D model, facial features, hair, hair color, etc., of the body 203 represented in the 2D body image 202 may be determined and used to augment the 3D model. For body segments of the 3D model that are not visible in the 2D body images, the texture for those segments may be predicted from other segments of the 3D body model. Likewise, in some implementations, clothing segments, such as upper clothing and lower clothing may be aligned with corresponding body segments or 2D landmarks of the 3D model to ensure that the representation of the clothes are aligned with the proper body segment of the 3D body model.

Similar to 3D model refinement, the approximate pose of the body in one of the 2D body images 202 may be determined and the 3D model adjusted accordingly so that the texture obtained from that 2D body image 202 may be aligned and used to augment that portion of the 3D model.

In some implementations, alignment of the 3D model with the approximate pose of the body 203 may be performed for each 2D body image 202-1 through 202-N so that texture information or data from the different views of the body 203 represented in the different 2D body images 202 may be used to augment the different poses of the resulting 3D model.

The result of the processing illustrated in the transition 200 is a dimensionally accurate 3D model 214 or avatar representative of the body of the user, that has been generated from 2D body images 202 of the body 203 of the user, regardless of whether all or only a portion of the body was represented and visible in the 2D body image(s). In some implementations, the resulting model may be cropped to exclude aspects of the model from any rendering that is presented to the user. For example, in some implementations, the 3D model may be cropped to represent the 3D body model from the neck to the ankles, excluding the head and feet. In other implementations, all of the 3D body model may be rendered and presented.

Figure 2B:
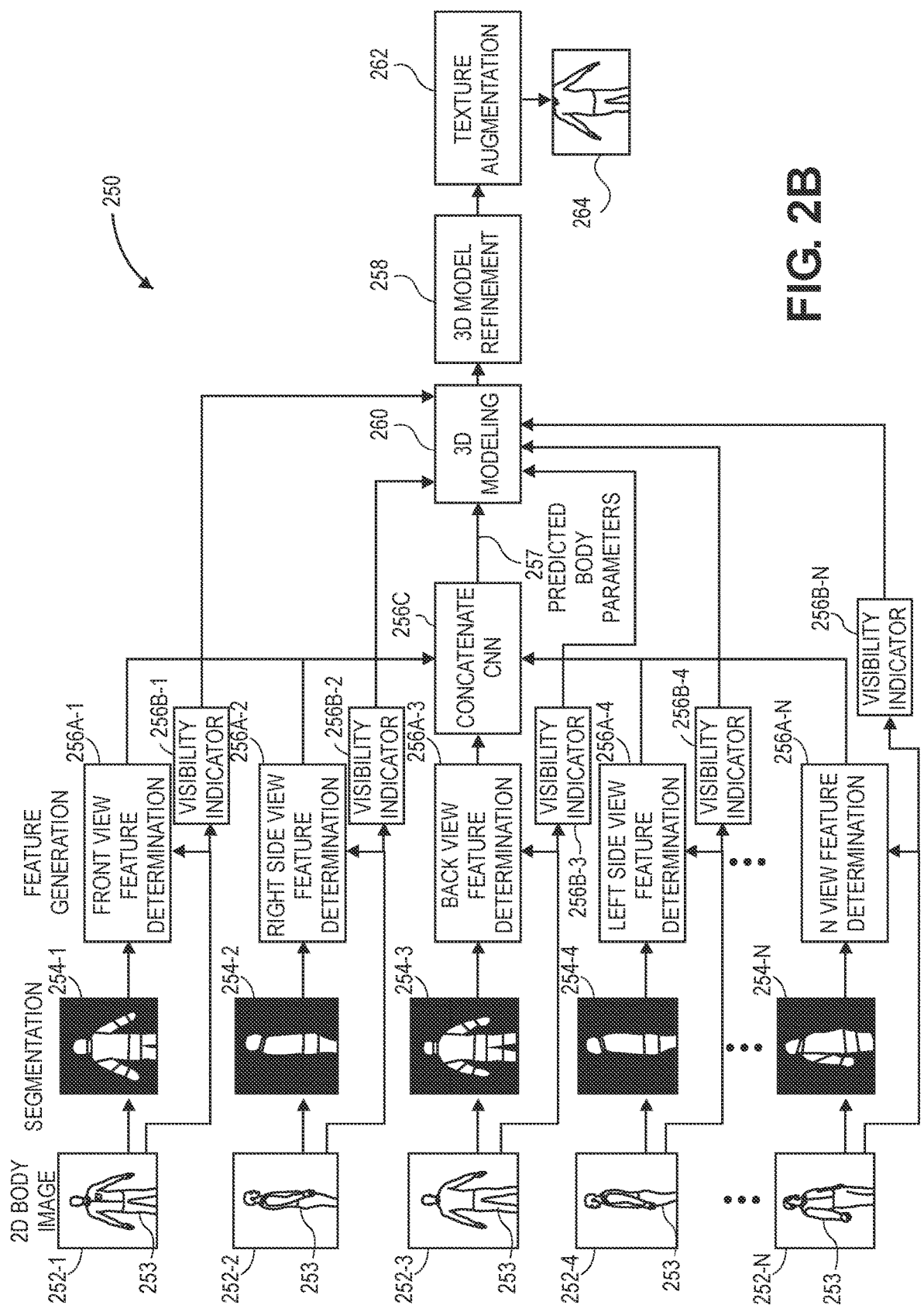
FIG. 2B is another transition diagram of processing two-dimensional body images to produce a dimensionally accurate three-dimensional model of that body, in accordance with implementations of the present disclosure.

FIG. 2B is another transition diagram 250 of processing 2D body images 252 of a body to produce a dimensionally accurate three-dimensional model of that body, in accordance with implementations of the present disclosure.

In some implementations, multiple 2D body images of a body from different views (e.g., front view, side view, back view, three-quarter view, etc.), such as 2D body images 252-1, 252-2, 252-3, 252-4 through 252-N may be utilized with the disclosed implementations to generate a dimensionally accurate 3D model of the body. In the illustrated example, the first 2D body image 252-1 is an image of at least a portion of a human body 253 oriented in a front view facing a 2D imaging element. The second 2D body image 252-2 is an image of at least a portion of the human body 253 oriented in a first side view facing the 2D imaging element. The third 2D body image 252-3 is an image of at least a portion of the human body 253 oriented in a back view facing the 2D imaging element. The fourth 2D body image 252-4 is an image of at least a portion of the human body 253 oriented in a second side view facing the 2D imaging element. As will be appreciated, any number of 2D body images 252-1 through 252-N may be generated with the view of the human body 253 in any number of orientations with respect to the 2D imaging element. In some implementations, some of the 2D body images may be 2D partial body images while other 2D body images include a full representation of the body of the user.

Each of the 2D body images 252-1 through 252-N are processed to segment pixels of the image to different body segments (or to background) to produce a segmented silhouette 254 of the human body as represented in that image. Segmentation may be done as discussed above with respect to FIG. 1A. For example, a CNN utilizing a semantic segmentation algorithm may be trained using images of human bodies, or simulated human bodies to train the CNN to distinguish between pixels that represent different body segments of human bodies. In such an example, the CNN may process the image 252 and indicate or label pixels that represent different body segments (head, hair, upper right arm, lower left leg, etc.), as well as pixels that do not represent a human body part, such as background or other objects represented in the image. Each pixel may be assigned a vector that indicates a probability score for each label as to whether the pixel corresponds to the labeled body segment.

In other implementations, other forms or algorithms, such as edge detection, shape detection, etc., may be used to determine pixels of the image 252 that represent different body segments of the user.

Returning to FIG. 2B, the first 2D body image 252-1 is processed to segment a plurality of pixels of the first 2D body image 252-1 into different body segments, to produce a front segmented silhouette 254-1 of the human body. The second 2D body image 252-2 is processed to segment a plurality of pixels of the second 2D body image 252-2 into different body segments, to produce a first side segmented silhouette 254-2 of the human body. The third 2D body image 252-3 is processed to segment a plurality of pixels of the third 2D body image 252-3 into different body segments, to produce a back segmented silhouette 254-3 of the human body. The fourth 2D body image 252-4 is processed to segment a plurality of pixels of the fourth 2D body image 252-4 into different body segments, to produce a second side segmented silhouette 254-4 of the human body. Processing of the 2D body images 252-1 through 252-N to produce segmented silhouettes 254-1 through 254-N from different orientations of the human body 253 may be performed for any number of images 252.

Similar to FIG. 2A, in some implementations, in addition to generating a segmented silhouette 254 from the 2D body image, the segmented silhouette may be normalized in size and centered in the image. For example, the segmented silhouette may be cropped by computing a bounding rectangle around the segmented silhouette 254. The segmented silhouette 254 may then be resized according to s, which is a function of a known height h of the user represented in the 2D body image (e.g., the height may be provided by the user):

$$s = h * \frac{0.8 * image_h}{\mu_h} \quad (1)$$

Where $image_h$ is the input image height, which may be based on the pixels of the image, and $\mu_h$ is the average height of a person (e.g., ~160 centimeters for females; ~176 centimeters for males). In some implementations, the body 253 represented in the 2D body image may be similarly resized to correspond to the resized dimensions of the resized segmented silhouette.

In addition to processing the 2D body images 252 to generate body segments, the 2D body images may be processed to determine visibility indicators for one or more 2D landmarks of the body. For example, the first 2D body image 252-1 may be processed by a first visibility indicator CNN 256B-1 to determine visibility indicators for each of one or more 2D landmarks, each visibility indicator indicating whether the respective landmark is visible in the first 2D body image 252-1. The second 2D body image 252-2 may be processed by a second visibility indicator CNN 256B-2 to determine visibility indicators for each of the one or more 2D landmarks, each visibility indicator indicating whether the respective landmark is visible in the second 2D body image 252-2. The third 2D body image 252-3 may be processed by a third visibility indicator CNN 256B-3 to determine visibility indicators for each of the one or more 2D landmarks, each visibility indicator indicating whether the respective landmark is visible in the third 2D body image 252-3. The fourth 2D body image 252-4 may be processed by a fourth visibility indicator CNN 256B-4 to determine visibility indicators for each of the one or more 2D landmarks, each visibility indicator indicating whether the respective landmark is visible in the fourth 2D body image 252-4. Processing of the 2D body images may be done for each image, through the Nth 2D body image 252-N, which may be processed by an Nth visibility indicator CNN 256B-N to determine visibility indicators for each of the one or more 2D landmarks, each visibility indicator indicating whether the respective landmark is visible in the Nth 2D body image 252-N. While the illustrated example describes each 2D body image being processed by a separate neural network to determine respective visibility indicators, in other implementations, one or more of the 2D body images 252 may be processed by the same neural network (e.g., the same CNN). The visibility indicators for each of the one or more 2D landmarks, generated by each of the visibility indicators CNNs 256B may be provided to 3D modeling 260.

Each segmented silhouette 254 representative of the body may then be processed to determine body traits or features of the human body. For example, different CNNs may be trained using segmented silhouettes of bodies, such as human bodies, from different orientations with known features. In some implementations, different CNNs may be trained for different orientations. For example, a first CNN 256A-1 may be trained to determine front view features from front view segmented silhouettes 254-1. A second CNN 256A-2 may be trained to determine right side features from right side segmented silhouettes. A third CNN 256A-3 may be trained to determine back view features from back view segmented silhouettes. A fourth CNN 256A-4 may be trained to determine left side features from left side segmented silhouettes. Different CNNs 256A-1 through 256A-N may be trained for each of the different orientations of segmented silhouettes 254-1 through 254-N. Alternatively, one CNN may be trained to determine features from any orientation segmented silhouette. Likewise, the same CNN may be used to determine body features and visibility indicators of one or more of the 2D body images.

In some implementations, the same or different CNNs may also utilize the 2D body image 202 as an input to the CNN that is used to generate and determine the body features. For example, the first CNN 256A-1 may be trained to determine front view features based on inputs of the front view segmented silhouettes 254-1 and/or the 2D body image 252-1. The second CNN 256A-2 may be trained to determine right side features from right side segmented silhouettes and/or the right side 2D body image 252-2. The third CNN 256A-3 may be trained to determine back view features from back view segmented silhouettes and/or the back view 2D body image 252-3. The fourth CNN 256A-4 may be trained to determine left side features from left side segmented silhouettes and/or the left side 2D body image 252-4. Different CNNs 256A-1 through 256A-N may be trained for each of the different orientations of segmented silhouettes 254-1 through 254-N and/or 2D body images 252-1 through 252-N.

In still other implementations, different CNNS may be trained for each of the segmented silhouettes 254 and the 2D body images. For example, the first CNN 256A-1 may be trained to determine front view features from the segmented silhouette 254-1 and another front view CNN may be trained to determine front view features from the 2D body image 252-1. The second CNN 256A-2 may be trained to determine right side view features from the segmented silhouette 254-2 and another right side view CNN may be trained to determine right side view features from the 2D body image 252-2. The third CNN 256A-3 may be trained to determine back view features from the segmented silhouette 254-3 and another back view CNN may be trained to determine back view features from the 2D body image 252-3. The fourth CNN 256A-4 may be trained to determine left side view features from the segmented silhouette 254-4 and another left side view CNN may be trained to determine left side view features from the 2D body image 252-4.

In implementations that utilize multiple images of the body 253 and/or multiple segmented silhouettes to produce multiple sets of features, such as the example illustrated in FIG. 2B, those features may be concatenated 256C and the concatenated features processed together with a CNN to generate a set of predicted body parameters 257. For example, a CNN may be trained to receive features generated from different segmented silhouettes 254, features generated from different 2D body images 252, and/or features generated by a CNN that processes both segmented silhouettes 254 and the 2D body images 252 to produce predicted body parameters 257. The predicted body parameters 257 may indicate any aspect or information related to the body 253 represented in the images 252. For example, the predicted body parameters 257 may indicate body volume, shape of the body, pose angles, etc. In some implementations, the CNN 256C may be trained to predict hundreds of body parameters 257 corresponding to the body 253 represented in the images 252.

Utilizing the predicted body parameters 257 and visibility indicators 256 received from the one or more visibility indicator CNNs 256B, 3D modeling 260 of the body 253 represented in the 2D body images 252 is performed to generate a 3D model of the body 253 represented in the 2D body images 252. As illustrated above, the 3D model may be a full representation of the body of the user, even if the 2D body images are 2D partial body images. For example, if the input images do not include a representation of the lower leg segments and feet of the user, such as the example discussed above, the generated 3D model may include a model of the non-visible segments of the body of the user, in this example the lower leg segments and feet.

The body parameters 257 may be provided to a body model, such as the SCAPE body model, the SMPL body model, etc., and the body model may generate the 3D model of the body 253 represented in the images 252 based on those predicted body parameters 257. To improve accuracy of the 3D model, in some implementations, data corresponding to any 2D landmark that is determined to not be visible, as indicated by the respective visibility indicator, may be ignored or omitted by the body model in generation of the 3D model as the data for those landmark body parameters may be unreliable or inaccurate. Instead, the model may determine 2D landmarks for those non-visible body joints based on the position of other body joints of the body of the user that are visible.

In the illustrated example, 3D model refinement 258 may be performed to refine or revise the generated 3D model to better represent the body 253 represented in the 2D body images 252. Initially, for each 2D landmark determined to be visible in one or more of the images 252, as indicated by the corresponding visibility indicator, the position of the 2D landmark as represented in the 3D model may be compared with the representation of the body of the user in the 2D image 252 to determine differences therebetween. The determined 2D landmarks may then be updated to align the determined 2D landmarks that are used to generate the 3D model with the position of those 2D landmarks as represented in the 2D body image 252.

In addition to aligning the 2D landmarks, 3D model refinement 258 may process each body segment of the 3D body model with respect to the corresponding segment as specified in the segmented silhouette. For example, each body segment of the 3D body model may be compared with each segment of the segmented silhouette. An error or difference between each body segment comparison may be determined and one or more of the body segments as represented in the 3D model may be adjusted to correct for the error. The adjustments and comparisons may be done in an iterative fashion until there is no or little difference between the shape of the body 253 of the user represented in the image 252 and the shape of the 3D model. For example, the segmented silhouette and the 3D model may be provided to a machine learning system, such as PYTORCH, and the body segments of the 3D model may be adjusted based on an iterative comparison of each body segment of the 3D model with the visible body segments of the segmented silhouette. For body segments that are not visible, the body segment size, shape, and position may be generated or determined based on the position of other body segments and/or 2D landmarks of the body that are visible in the 2D image from which the 3D model was generated. Likewise, those body segments may be adjusted or updated as part of the iterative processing and refinement of the visible body segments.

In some implementations, the 3D model may be compared to a single image, such as image 252-1. In other implementations, the 3D model may be compared to each of the 2D body images 252-1 through 252-N in parallel or sequentially. In still other implementations, one or more 2D model images may be generated from the 3D model and those 2D model images may be compared to the segmented silhouettes and/or the 2D body images to determine differences between the 2D model images and the segmented silhouette/2D body images.

Comparing the 3D model and/or a 2D model image with a 2D body image 252 or segmented silhouette 254 may include determining an approximate pose of the body 253 represented in the 2D body image and adjusting the 3D model to the approximate pose. The 3D model or rendered 2D model image may then be overlaid or otherwise compared to the body 253 represented in the 2D body image 252 and/or represented in the segmented silhouette 254 to determine a difference between body segments of the 3D model and visible body segments of the 2D body image.

Based on the determined differences between the 3D model and the body 253 represented in the 2D body image 252, the segmented silhouette 254 generated from that image may be revised to account for those differences. Alternatively, the predicted body parameters and/or the 3D model may be revised to account for those differences.

In some implementations, upon completion of 3D model refinement 258, the 3D model of the body represented in the 2D body images 252 may be augmented with one or more textures, texture augmentation 262, determined from one or more of the 2D body images 252-1 through 252-N. For example, the 3D model may be augmented to have a same or similar color to a skin color of the body 253 represented in the 2D body images 252, clothing or clothing colors represented in the 2D body images 252 may be used to augment the 3D model, facial features, hair, hair color, etc., of the body 253 represented in the 2D body image 252 may be determined and used to augment the 3D model. For body segments of the 3D model that are not visible in the 2D body images, the texture for those segments may be predicted from other segments of the 3D body model. Likewise, in some implementations, clothing segments, such as upper clothing and lower clothing may be aligned with corresponding body segments or 2D landmarks of the 3D model to ensure that the representation of the clothes are aligned with the proper body segment of the 3D body model.

Similar to 3D model refinement, the approximate pose of the body in one of the 2D body images 252 may be determined and the 3D model adjusted accordingly so that the texture obtained from that 2D body image 252 may be aligned and used to augment that portion of the 3D model. In some implementations, alignment of the 3D model with the approximate pose of the body 253 may be performed for each 2D body image 252-1 through 252-N so that texture information or data from the different views of the body 253 represented in the different 2D body images 252 may be used to augment the different poses of the resulting 3D model.

The result of the processing illustrated in the transition 250 is a dimensionally accurate 3D model 264, or avatar representative of the body of the user, that has been generated from 2D body images 252 of the body 253 of the user, regardless of whether all or only a portion of the body was represented and visible in the 2D body image(s). In some implementations, the resulting model may be cropped to exclude aspects of the model from any rendering that is presented to the user. For example, in some implementations, the 3D model may be cropped to represent the 3D body model from the neck to the ankles, excluding the head and feet. In other implementations, all of the 3D body model may be rendered and presented.

As discussed above, features or objects expressed in imaging data, such as human bodies, colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, segmented silhouettes, shapes or other characteristics of objects, or portions of objects, expressed in images may be identified using one or more algorithms or machine-learning tools. The objects or portions of objects may be identified at single, finite periods of time, or over one or more periods or durations. Such algorithms or tools may be directed to recognizing and marking transitions (e.g., the edges, contours, outlines, colors, textures, segmented silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; semantic segmentation algorithms; background subtraction; or any other algorithms or techniques that may be known to those of ordinary skill in the pertinent arts.

Image processing algorithms, other machine learning algorithms or CNNs may be operated on computer devices of various sizes or types, including but not limited to smartphones or other cell phones, tablets, video cameras or other computer-based machines. Such mobile devices may have limited available computer resources, e.g., network bandwidth, storage capacity or processing power, as compared to larger or more complex computer devices. Therefore, executing computer vision algorithms, other machine learning algorithms, or CNNs on such devices may occupy all or much of the available resources, without any guarantee, or even a reasonable assurance, that the execution of such algorithms will be successful. For example, processing digital 2D body images captured by a user of a portable device (e.g., smartphone, tablet, laptop, webcam) according to one or more algorithms in order to produce a 3D model from the digital images may be an ineffective use of the limited resources that are available on the smartphone or tablet. Accordingly, in some implementations, as discussed herein, some or all of the processing may be performed by one or more computing resources that are remote from the portable device. In some implementations, initial processing of the images to generate binary segmented silhouettes may be performed on the device. Subsequent processing to generate and refine the 3D model may be performed on one or more remote computing resources. For example, the segmented silhouettes may be sent from the portable device to the remote computing resources for further processing. Still further, in some implementations, texture augmentation of the 3D model of the body may be performed on the portable device or remotely.

In some implementations, to increase privacy of the user, only the binary segmented silhouette may be sent from the device for processing on the remote computing resources and the original 2D images that include the representation of the user may be maintained locally on the portable device. In such an example, the rendered 3D model may be sent back to the device and the device may perform texture augmentation of the received 3D model based on those images. Utilizing such a distributed computing arrangement retains user identifiable information on the portable device of the user while at the same time leveraging the increased computing capacity available at remote computing resources.

Machine learning tools, such as artificial neural networks, have been utilized to identify relations between respective elements of apparently unrelated sets of data. An artificial neural network, such as CNN, is a parallel distributed computing processor comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses have been utilized in image processing applications.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive one or more inputs and generate one or more outputs in accordance with an activation or energy function, with parameters corresponding to the various strengths or synaptic weights. Likewise, each of the neurons within a network may be understood to have different activation or energy functions; in this regard, such a network may be dubbed a heterogeneous neural network. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information specifically flows in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize the error in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate an image with a label, a category, a cluster or a pseudo label thereof, to within an acceptable tolerance, an input and/or multiple inputs, in the form of an image, segmented silhouette, features, known traits corresponding to the image, etc., may be provided to the trained network, and an output generated therefrom. For example, the CNN discussed above may receive as inputs a generated segmented silhouette and one or more body attributes (e.g., height, weight, gender) corresponding to the body represented by the segmented silhouette. The trained CNN may then produce as outputs the predicted features corresponding to those inputs.

Figure 3:
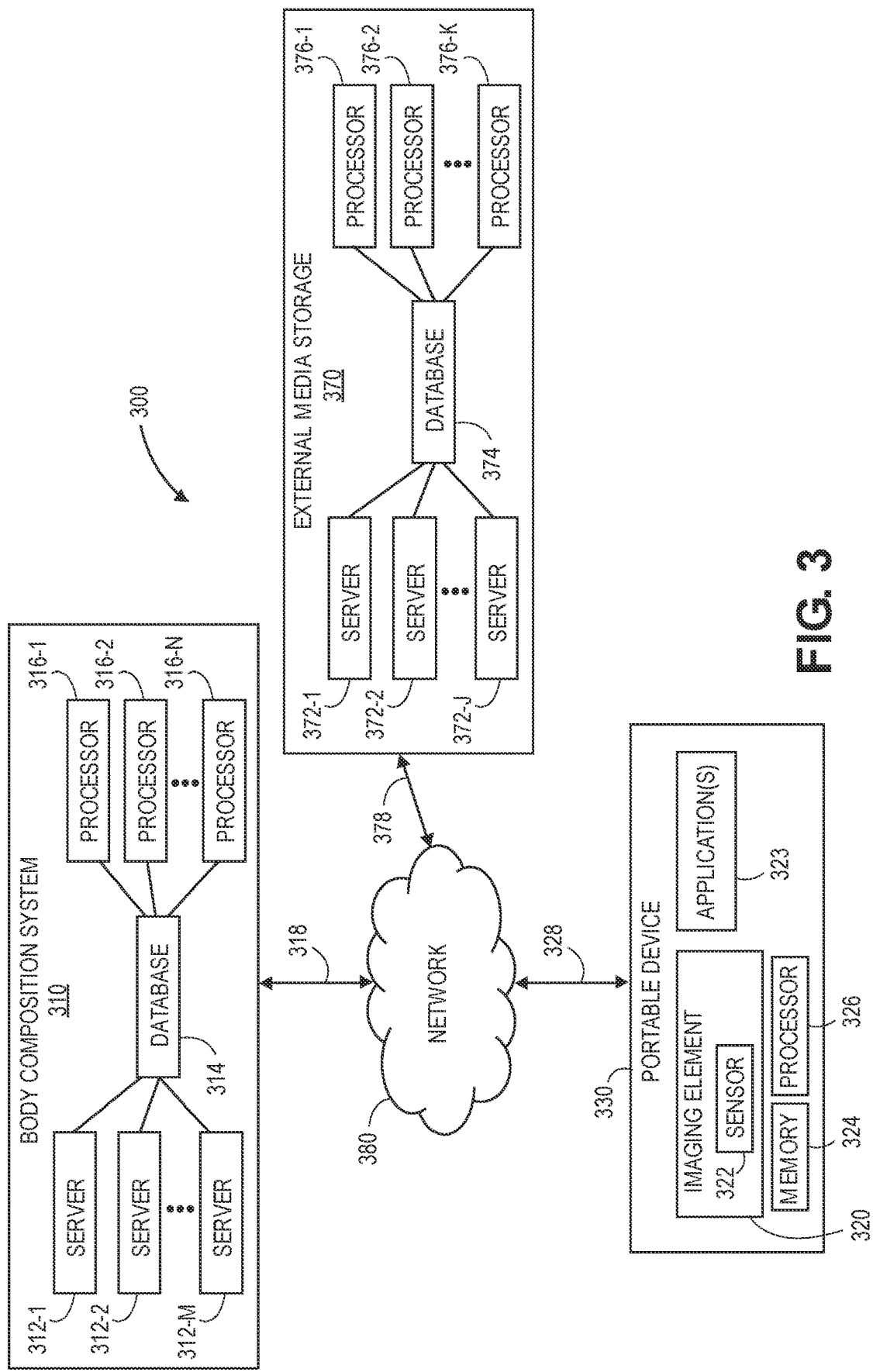
FIG. 3 is a block diagram of components of an image processing system, in accordance with implementations of the present disclosure.

Referring to FIG. 3, a block diagram of components of one image processing system 300 in accordance with implementations of the present disclosure is shown.

The system 300 of FIG. 3 includes a body composition system 310, an imaging element 320 that is part of a portable device 330 of a user, such as a tablet, a laptop, a cellular phone, a webcam, etc., and an external media storage facility 370 connected to one another across a network 380, such as the Internet.

The body composition system 310 of FIG. 3 includes M physical computer servers 312-1, 312-2 . . . 312-M having one or more databases (or data stores) 314 associated therewith, as well as N computer processors 316-1, 316-2 . . . 316-N provided for any specific or general purpose. For example, the body composition system 310 of FIG. 3 may be independently provided for the exclusive purpose of generating 3D models from 2D body images captured by imaging elements, such as imaging element 320, or segmented silhouettes produced therefrom, or, alternatively, provided in connection with one or more physical or virtual services configured to manage or monitor such information, as well as one or more other functions. The servers 312-1, 312-2 . . . 312-M may be connected to or otherwise communicate with the databases 314 and the processors 316-1, 316-2 . . . 316-N. The databases 314 may store any type of information or data, including simulated segmented silhouettes, body parameters, simulated 3D models, simulated partial segmented silhouettes, etc. The servers 312-1, 312-2 . . . 312-M and/or the computer processors 316-1, 316-2 . . . 316-N may also connect to or otherwise communicate with the network 380, as indicated by line 318, through the sending and receiving of digital data.

The imaging element 320 may comprise any form of optical recording sensor or device that may be used to photograph or otherwise record information or data regarding a body of the user, or for any other purpose. As is shown in FIG. 3, the portable device 330 that includes the imaging element 320 is connected to the network 380 and includes one or more sensors 322, one or more memory or storage components 324 (e.g., a database or another data store), one or more processors 326, and any other components that may be required in order to capture, analyze and/or store imaging data, such as the 2D body images discussed herein. For example, the imaging element 320 may capture one or more still or moving images and may also connect to or otherwise communicate with the network 380, as indicated by the line 328, through the sending and receiving of digital data.

Although the system 300 shown in FIG. 3 includes just one imaging element 320 therein, any number or type of imaging elements, portable devices, or sensors may be provided within any number of environments in accordance with the present disclosure.

The portable device 330 may be used in any location and any environment to generate 2D body images that represent a body of the user. In some implementations, the portable device may be positioned such that it is stationary and approximately vertical (within approximately ten-degrees of vertical) and the user may position their body within a field of view of the imaging element 320 of the portable device at different orientations so that the imaging element 320 of the portable device may generate 2D body images that include a representation of the body of the user from different orientations.

The portable device 330 may also include one or more applications 323 stored in memory that may be executed by the processor 326 of the portable device to cause the processor of the portable device to perform various functions or actions. For example, when executed, the application 323 may provide instructions to a user regarding placement of the portable device, positioning of the body of the user within the field of view of the imaging element 320 of the portable device, orientation of the body of the user, etc. Likewise, in some implementations, the application may present a 3D model, generated from the 2D body images in accordance with the described implementations, to the user and allow the user to interact with the 3D model. For example, a user may rotate the 3D model to view different angles of the 3D model, obtain approximately accurate measurements of the body of the user from the dimensions of the 3D model, view body fat, body mass, volume, etc. Likewise, in some implementations, the 3D model may be modified by request of the user to simulate what the body of the user may look like under certain conditions, such as loss of weight, gain of muscle, etc.

The external media storage facility 370 may be any facility, station or location having the ability or capacity to receive and store information or data, such as segmented silhouettes, simulated or rendered 3D models of bodies, textures, body dimensions, etc., received from the body composition system 310, and/or from the portable device 330. As is shown in FIG. 3, the external media storage facility 370 includes J physical computer servers 372-1, 372-2 . . . 372-J having one or more databases 374 associated therewith, as well as K computer processors 376-1, 376-2 . . . 376-K. The servers 372-1, 372-2 . . . 372-J may be connected to or otherwise communicate with the databases 374 and the processors 376-1, 376-2 . . . 376-K. The databases 374 may store any type of information or data, including digital images, segmented silhouettes, 3D models, etc. The servers 372-1, 372-2 . . . 372-J and/or the computer processors 376-1, 376-2 . . . 376-K may also connect to or otherwise communicate with the network 380, as indicated by line 378, through the sending and receiving of digital data.

The network 380 may be any wired network, wireless network, or combination thereof, and may comprise the Internet in whole or in part. In addition, the network 380 may be a personal area network, local area network, wide area network, cable network, satellite network, cellular telephone network, or combination thereof. The network 380 may also be a publicly accessible network of linked networks, possibly operated by various distinct parties, such as the Internet. In some implementations, the network 380 may be a private or semi-private network, such as a corporate or university intranet. The network 380 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The body composition system 310, the portable device 330 or the external media storage facility 370 may use any web-enabled or Internet applications or features, or any other client-server applications or features including E-mail or other messaging techniques, to connect to the network 380, or to communicate with one another, such as through short or multimedia messaging service (SMS or MMS) text messages. For example, the servers 312-1, 312-2 . . . 312-M may be adapted to transmit information or data in the form of synchronous or asynchronous messages from the body composition system 310 to the processor 326 or other components of the portable device 330, or any other computer device in real time or in near-real time, or in one or more offline processes, via the network 380. Those of ordinary skill in the pertinent art would recognize that the body composition system 310, the portable device 330 or the external media storage facility 370 may operate any of a number of computing devices that are capable of communicating over the network, including but not limited to set-top boxes, personal digital assistants, digital media players, web pads, laptop computers, desktop computers, electronic book readers, cellular phones, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 312-1, 312-2 . . . 312-M, the processor 326, the servers 372-1, 372-2 . . . 372-J, or any other computers or control systems utilized by the body composition system 310, the portable device 330, applications 323, or the external media storage facility 370, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 4:
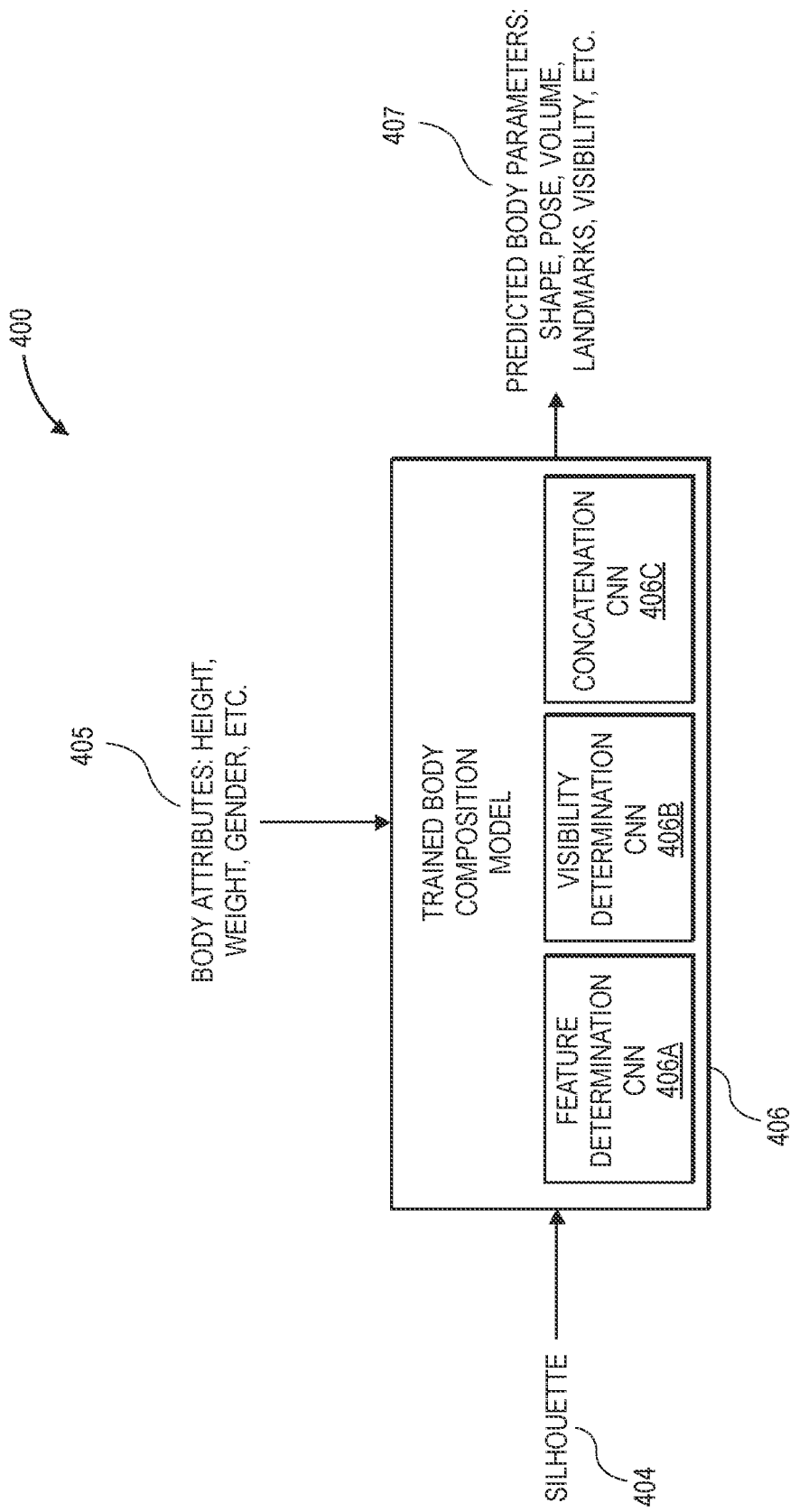
FIG. 4 is a block diagram of a trained body composition model that determines predicted body parameters of a body represented in two-dimensional body images, in accordance with implementations of the present disclosure.

FIG. 4 is a block diagram of a trained body composition model 400 that determines predicted body parameters 407 of a body represented in two-dimensional images, in accordance with implementations of the present disclosure. As discussed above, the model 400 may be a neural network, such as a CNN that is trained to receive one or more inputs that are processed to generate one or more outputs, such as the predicted body parameters 407, such as different body segments. In the illustrated example, the trained body composition model 406 may include several component CNNs that receive different inputs and provide different outputs. Likewise, outputs from one of the component CNNs may be provided as an input to one or more other component CNNs of the trained body composition model. For example, the trained body composition model may include three parts of component CNNs. In one implementation, a first component part may include one or more feature determination CNNs 406A, a second component part may include a visibility determination CNN 406B, and a third component part may include a concatenation CNN 406C. In the illustrated example, there may be different feature determination CNNs 406A for each of the different body orientations (e.g., front view, right side view, back view, left side view, three-quarter view), different segmented silhouettes 404 corresponding to those different body orientations, and/or different 2D body images corresponding to those different body orientations, each CNN trained for inputs having the particular orientation. Likewise, in some implementations, the feature determination CNNs 406A may receive multiple different types of inputs. For example, in addition to receiving a segmented silhouette 404 and/or 2D body image, each feature determination CNN 406A may receive one or more body attributes 405 corresponding to the body represented by the segmented silhouettes 404 and/or 2D body images. The body attributes 405 may include, but are not limited to, height, weight, gender, etc. As discussed, the trained feature determination CNNs 406A process the inputs and generate features representative of the bodies represented in the 2D body images that were used to produce the segmented silhouettes 404. For example, if there are four segmented silhouettes, one for a front view, one for a right side view, one for a back view, and one for a left side view, the four feature determination CNNs 406A trained for those views each produce a set of features representative of the body represented in the 2D body image used to generate the segmented silhouette.

Utilizing segmented silhouettes 404 of bodies improves the accuracy of the feature determination CNN 406A as it can focus purely on size, shape, dimensions, etc., of the body, devoid of any other aspects (e.g., color, clothing, hair, etc.). In other implementations, the use of the 2D body images in conjunction with or independent of the segmented silhouettes provides additional data, such as shadows, skin tone, etc., that the feature determination CNN 406A may utilize in determining and producing a set of features representative of the body represented in the 2D body image.

Likewise, there may be different visibility determination CNNs 406B for each of the different body orientations (e.g., front view, right side view, back view, left side view, three-quarter view), different segmented silhouettes 404 corresponding to those different body orientations, and/or different 2D body images corresponding to those different body orientations, each CNN trained for inputs having the particular orientation. Likewise, in some implementations, the visibility determination CNNs 406B may receive multiple different types of inputs. For example, in addition to receiving a segmented silhouette 404 and/or 2D body image, each visibility determination CNN 406B may receive from each of the feature determination CNNs 406A body 2D landmarks and determine whether those body 2D landmarks are visible in the 2D body image. For each body 2D landmark, the visibility determination CNN 406B determines a visibility indicator indicative of whether the 2D landmark is visible in the corresponding 2D image.

The features output from the feature determination CNNs 406A and the visibility indicators output from the visibility determination CNNs 406B, in the disclosed implementation, are received as inputs to the concatenation CNN 406C. Likewise, in some implementations, the concatenation CNN 406C may be trained to receive other inputs, such as body attributes 405.

As discussed, the concatenation CNN 406C may be trained to receive the inputs of features, visibility indicators, and optionally other inputs, produce concatenated features, and produce as outputs a set of predicted body parameters 407 corresponding to the body represented in the 2D body images. In some implementations, the predicted body parameters may include hundreds of parameters, including, but not limited to, shape, pose, volume, 2D landmark, visibility indicators for each 2D landmark, etc., of the represented body.

Figure 5:
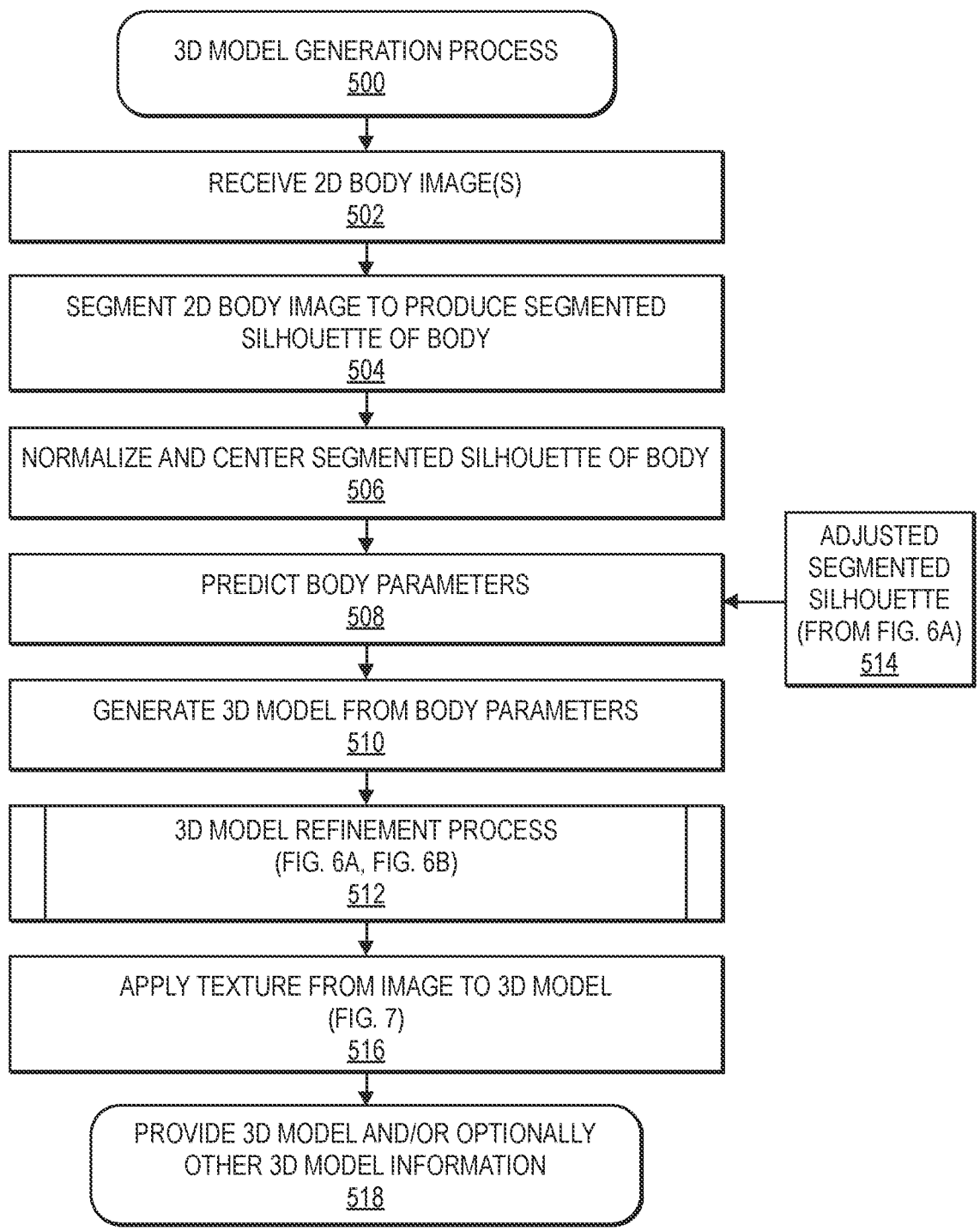
FIG. 5 is an example flow diagram of a three-dimensional model generation process, in accordance with implementations of the present disclosure.

FIG. 5 is an example flow diagram of a three-dimensional model generation process 500, in accordance with implementations of the present disclosure.

The example process 500 begins upon receipt of one or more 2D body images of a body, as in 502. As noted above, the disclosed implementations are operable with any number of 2D body images for use in generating a 3D model of that body. For example, in some implementations, a single 2D body image may be used. In other implementations, two, three, four, or more 2D body images may be used.

As discussed above, the 2D body images may be generated using any 2D imaging element, such as a camera on a portable device, a webcam, etc. The received 2D body images are then segmented to produce a segmented silhouette of the body represented in the one or more 2D body images, as in 504. As discussed above, the 2D body images may be processed by a CNN that is trained to identify body segments (e.g., hair, head, neck, upper arm, etc.) and generate a vector for each pixel of the 2D body image, the vector including prediction scores for each potential body segment (label) indicating a likelihood that the pixel corresponds to the body segment.

In addition, in some implementations, the segmented silhouettes may be normalized in height and centered in the image before further processing, as in 506. For example, the segmented silhouettes may be normalized to a standard height based on a function of a known or provided height of the body of the user represented in the image and an average height (e.g., average height of female body, average height of male body). In some implementations, the average height may be more specific than just gender. For example, the average height may be the average height of a gender and a race corresponding to the body, or a gender and a location (e.g., United States) of the user, etc.

The normalized and centered segmented silhouette may then be processed by one or more neural networks, such as one or more CNNs as discussed above, to generate predicted body parameters representative of the body represented in the 2D body images, as in 508. As discussed above, there may be multiple steps involved in body parameter prediction. For example, each segmented silhouette may be processed using CNNs trained for the respective orientation of the segmented silhouette to generate sets of features of the body as determined from the segmented silhouette. The sets of features generated from the different segmented silhouettes may then be processed using a neural network, such as a CNN, to concatenate the features and generate the predicted body parameters representative of the body represented in the 2D body images.

The predicted body parameters may then be provided to one or more body models, such as an SMPL body model or a SCAPE body model and the body model may generate a 3D model for the body represented in the 2D body images, as in 510. In addition, in some implementations, the 3D model may be revised, if necessary, to more closely correspond to the actual image of the body of the user, as in 512. 3D model refinement is discussed above, and discussed further below with respect to FIGS. 6A and 6B.

As discussed below, the 3D model adjustment process 600 (FIG. 6A) returns an adjusted segmented silhouette, as in 514. Upon receipt of the adjusted segmented silhouette, the example process 500 again generates predicted body parameters, as in 508, and continues. This may be done until no further refinements are to be made to the segmented silhouette. In comparison, the 3D model refinement process 650 (FIG. 6B) generates and returns an adjusted 3D model and the example process 500 continues at block 516.

Figure 6A:
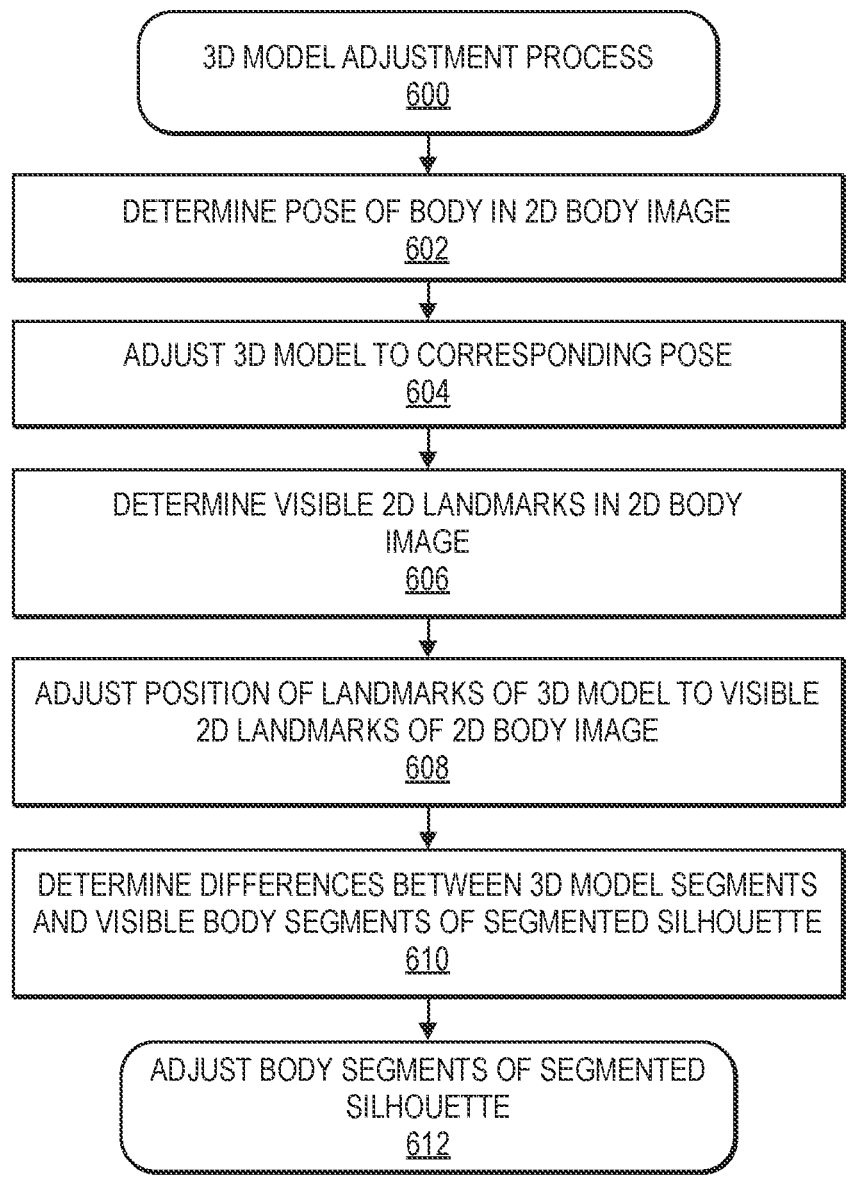
FIG. 6A is an example flow diagram of a three-dimensional model adjustment process, in accordance with implementations of the present disclosure.
Figure 6B:
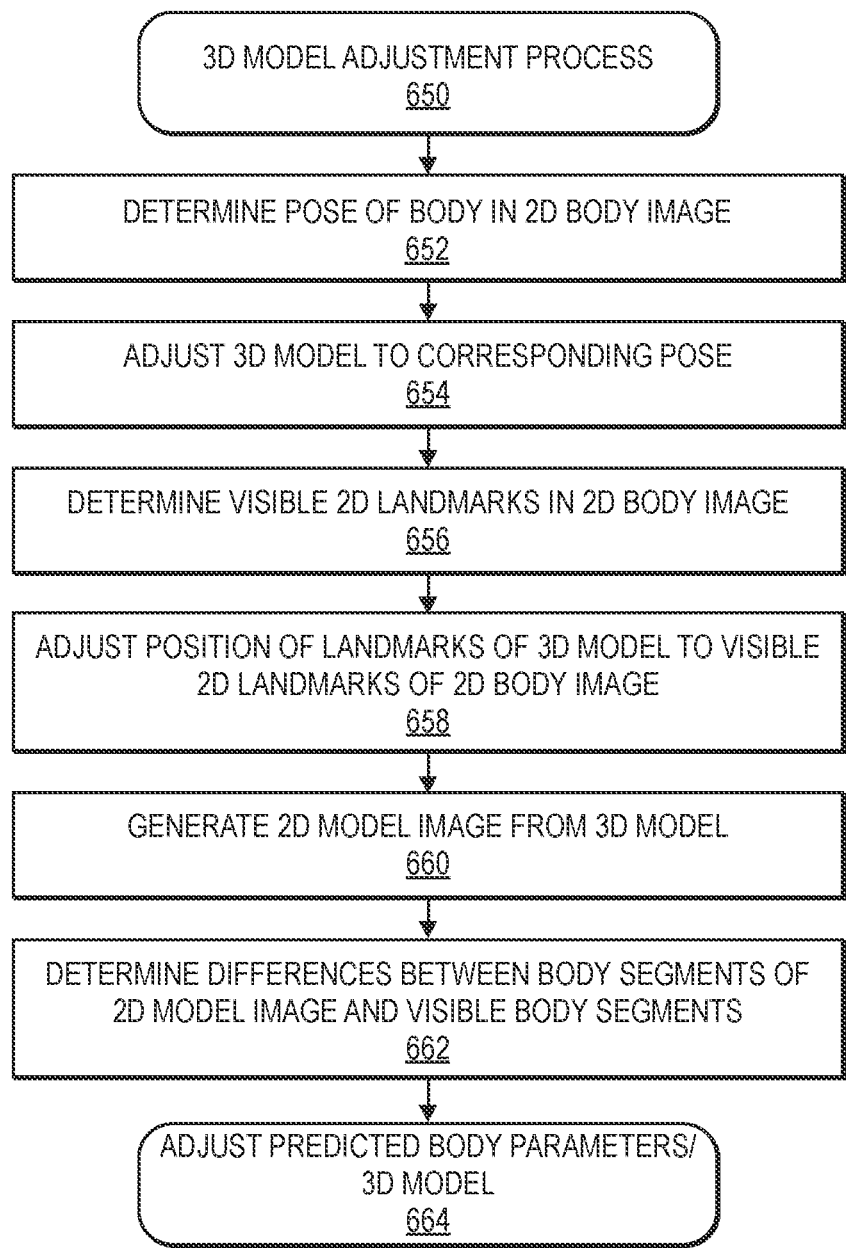
FIG. 6B is another example flow diagram of a three-dimensional model adjustment process, in accordance with implementations of the present disclosure.

After adjustment of the segmented silhouette and generation of a 3D model from adjusted body parameters, or after receipt of the adjusted 3D model from FIG. 6B, one or more textures (e.g., skin tone, hair, clothing, etc.) from the 2D body images may be applied to the 3D model, as in 516. Applying texture to the 3D model is discussed further below with respect to FIG. 7. Finally, the 3D model may be provided to the user as representative of the body of the user and/or other 3D model information (e.g., body mass, 2D landmarks, arm length, body fat percentage, etc.) may be determined from the model, as in 518.

FIG. 6A is an example flow diagram of a 3D model adjustment process 600, in accordance with implementations of the present disclosure. The example process 600 begins by determining a pose of a body represented in one of the 2D body images, as in 602. A variety of techniques may be used to determine the approximate pose of the body represented in a 2D body image. For example, camera parameters (e.g., camera type, focal length, shutter speed, aperture, etc.) included in the metadata of the 2D body image may be obtained and/or additional camera parameters may be determined and used to estimate the approximate pose of the body represented in the 2D body image. For example, a 3D model may be used to approximate the pose of the body in the 2D body image and then a position of a virtual camera with respect to that model that would produce the 2D body image of the body may be determined. Based on the determined position of the virtual camera, the height and angle of the camera used to generate the 2D body image may be inferred. In some implementations, the camera tilt may be included in the metadata and/or provided by a portable device that includes the camera. For example, many portable devices include an accelerometer and information from the accelerometer at the time the 2D body image was generated may be provided as the tilt of the camera. Based on the received and/or determined camera parameters, the pose of the body represented in the 2D body image with respect to the camera may be determined, as in 602.

The 3D model of the body of the user may then be adjusted to correspond to the determined pose of the body in the 2D body image, as in 604. A determination is then made as to which 2D landmarks of the body are visible in the 2D body image, as in 606. For example, a defined set of 2D landmarks (e.g., left shoulder, right shoulder, left elbow, right elbow, right hip, left hip, etc.) may be defined and the 2D body image, segmented silhouette, and/or 3D model of the body may be processed to determine which of the set of 2D landmarks are visible in the 2D image.

For each 2D landmark that is determined to be visible in the 2D body image, the corresponding landmark in the 3D model is adjusted to correspond to the 2D landmark in the 2D body image, as in 608. For example, the coordinates of the 3D body model may be overlaid with 2D body image and the landmarks of the 3D model updated to correspond to the respective 2D landmarks as represented in the 2D body image. In some implementations, the location and/or shape of the body segments of the 3D model between landmarks may also be updated to correspond or align with the updated landmarks of the 3D model. For 2D landmarks that are determined to be invisible, for example the 2D landmark may be beyond the field of view represented in the image or occluded by another object represented in the image, the position data for that 2D landmark may not be considered and the landmark in the 3D model not adjusted based on the 2D landmark determined from the 2D body image. However, in some implementations, the landmark of the 3D body model that corresponds to a 2D landmark that is determined to not be visible in the 2D body image may be adjusted based on the repositioning of other 2D landmarks that are visible in the 2D body image.

With the 3D model adjusted to approximately the same pose as the user represented in the 2D body image and the landmarks of the 3D model aligned with the visible 2D landmarks of the 2D body image, the shape and position of each body segment of the 3D model may be compared to the shape of the corresponding visible body segments in the 2D body image and/or the body segments in the segmented silhouette to determine any differences between the body segments of the 3D model and the representation of the visible body segments in the 2D body image and/or segmented silhouette, as in 610. In the disclosed implementations, the visibility indicator determined for each body segment may be utilized to determine whether to compare the 3D body model segment with the body segment of the 2D body image and/or the segmented silhouette. For example, if the visibility indicator indicates that the body segment, or a portion thereof, is not visible in the 2D body image, the data represented in the segmented silhouette may be unreliable and therefore not utilized in determining the 3D body model.

Additionally, in some implementations, for visible body segments represented in the 2D body image, it may be determined whether any determined difference is above a minimum threshold (e.g., 2%). If it is determined that there is a difference between a body segment of the 3D model and the body segment represented in one or more of the 2D body images, the segmented silhouette may be adjusted, as in 612. The adjustment of body segments of the segmented silhouette may be performed in an iterative fashion taking into consideration the difference determined for each body segment and adjusting the visible body segments. The revised segmented silhouette may then be used to generate revised body parameters for the body represented in the 2D body images, as discussed above with respect to FIG. 5. If the segmented silhouette is revised, the revised segmented silhouette is returned to the example process 500, as discussed above and as illustrated in block 514 (FIG. 5). If no difference is determined or if it is determined that the difference does not exceed a minimum threshold, an indication may be returned to the example process 500 that there are no differences between the 3D model and the 2D body image/segmented silhouette.

FIG. 6B is an example flow diagram of another 3D model adjustment process 650, in accordance with implementations of the present disclosure.

The example process 650 begins by determining a pose of a body represented in one of the 2D body images, as in 652. A variety of techniques may be used to determine the approximate pose of the body represented in a 2D body image. For example, camera parameters (e.g., camera type, focal length, shutter speed, aperture, etc.) included in the metadata of the 2D body image may be obtained and/or additional camera parameters may be determined and used to estimate the approximate pose of the body represented in the 2D body image. For example, a 3D model may be used to approximate the pose of the body in the 2D body image and then a position of a virtual camera with respect to that model that would produce the 2D body image of the body may be determined. Based on the determined position of the virtual camera, the height and angle of the camera used to generate the 2D body image may be inferred. In some implementations, the camera tilt may be included in the metadata and/or provided by a portable device that includes the camera. For example, many portable devices include an accelerometer and information from the accelerometer at the time the 2D body image was generated may be provided as the tilt of the camera. Based on the received and/or determined camera parameters, the pose of the body represented in the 2D body image with respect to the camera may be determined, as in 652.

The 3D model of the body of the user may then be adjusted to correspond to the determined pose of the body in the 2D body image, as in 654. A determination is then made as to which 2D landmarks of the body are visible in the 2D body image, as in 656. For example, a defined set of 2D landmarks (e.g., left shoulder, right shoulder, left elbow, right elbow, right hip, left hip, etc.) may be defined and the 2D body image, segmented silhouette, and/or 3D model of the body may be processed to determine which of the set of 2D landmarks are visible in the 2D image.

For each 2D landmark that is determined to be visible in the 2D body image, the corresponding landmark in the 3D model is adjusted to correspond to the 2D landmark in the 2D body image, as in 658. For example, the coordinates of the 3D body model may be overlaid with the 2D body image and the body landmarks of the 3D model updated to correspond to the 2D landmarks as represented in the 2D body image. In some implementations, the location and/or shape of the body segments of the 3D model between landmarks may also be updated to correspond or align with the updated landmarks of the 3D model. For 2D landmarks that are determined to be invisible, for example the 2D landmark may be beyond the field of view represented in the image or occluded by another object represented in the image, the position data for that 2D landmark may not be considered and the landmark in the 3D model not adjusted based on the 2D landmark determined from the 2D body image. However, in some implementations, the landmark of the 3D body model that corresponds to a 2D landmark that is determined to not be visible in the 2D body image may be adjusted based on the repositioning of other 2D landmarks that are visible in the 2D body image.

With the 3D model adjusted to approximately the same pose as the user represented in the image and the landmarks of the 3D model aligned with the visible 2D landmarks of the 2D body image, a 2D model image from the 3D model is generated, as in 660. The 2D model image may be generated, for example, by converting or imaging the 3D model into a 2D model image with the determined pose, as if a digital 2D model image of the 3D model had been generated. Likewise, the 2D model image may be segmented to include body segments corresponding to body segments determined for the 3D model.

The body segments of the 2D model image are then compared with the visible body segments of the 2D body image and/or the segmented silhouette to determine any differences between the 2D model image and the representation of visible body segments of the body in the 2D body image and/or segmented silhouette, as in 662. For example, the 2D model image may be aligned with the 2D body image and/or the segmented silhouette and pixels of each corresponding body segment that is visible in the 2D body image compared to determine differences between the pixel values. In implementations in which the pixels of body segments are assigned different color values, an error (e.g., % difference) may be determined as a difference in pixel values between the 2D model image and the 2D body image for each segment. For body segments that are determined to be not visible in the 2D body image, the pixel values may not be compared. The error determined for visible body segments is differentiable and may be utilized to adjust the size, shape, and/or position of each body segment and the resulting predicted body parameters, thereby updating the shape of the 3D model.

In some implementations, for visible body segments, it may be determined whether any determined difference is above a minimum threshold (e.g., 2%). If it is determined that there is a difference between a body segment of the 2D model image and the body segment represented in one or more of the 2D body images/segmented silhouette, the segment in the 3D model and/or the predicted body parameters may be adjusted to correspond to the shape and/or size of the body segment represented in the 2D body image and/or the segmented silhouette, as in 664. This example process 650 may continue until there is no difference between the segments of the 2D model image and the visible body segments represented in the 2D body image/segmented silhouette, or the difference is below a minimum threshold. As discussed above, the revised 3D model produced from the example process 650, or if no adjustments are necessary, the 3D model is returned to example process 500 at block 512 and the process 500 continues.

Figure 7:
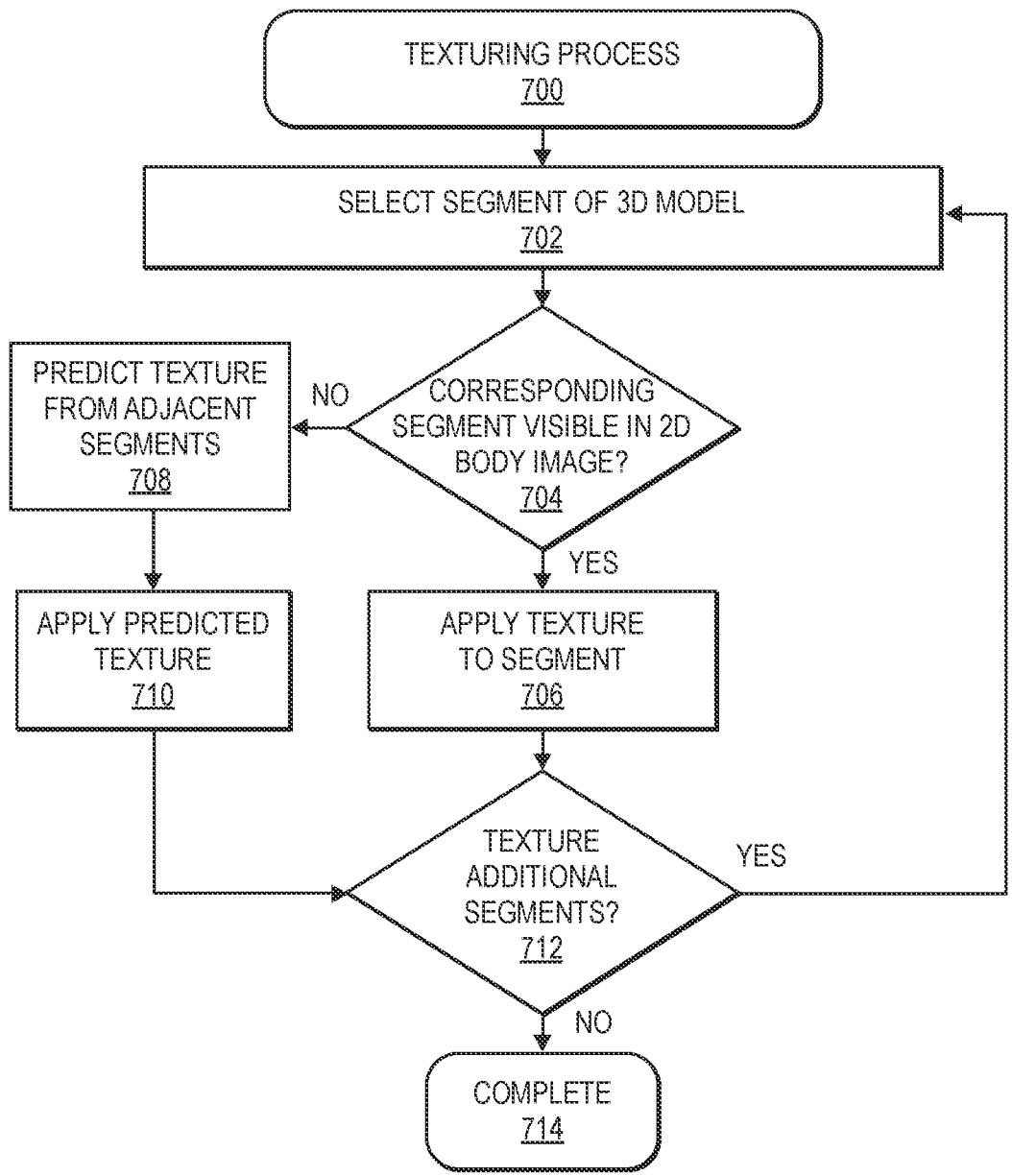
FIG. 7 is an example flow diagram of a texturing process, in accordance with implementations of the present disclosure.

FIG. 7 is an example texturing process 700, in accordance with disclosed implementations. The example process may be performed to apply texturing, such as skin color, hair, clothing, etc., to a 3D model of a body.

The example process 700 begins by selecting a segment of a 3D model to be textured, as in 702. In some implementations, the segment may be randomly selected. In other implementations, the example process 700 may first process all body segments that are determined to be visible in the corresponding 2D body image before processing body segments that are determined to be not visible in the corresponding 2D body image.

For the selected body segment, a determination is made as to whether the corresponding segment in the 2D body image is visible, as in 704. If it is determined that the corresponding segment is visible in the 2D body image, the texture of the segment, as represented in the 2D body image, is applied to the 3D model, as in 706. Applying texture to a 3D body model is known in the art and need not be discussed herein in detail.

If it is determined that the selected body segment is determined to not be visible in the corresponding 2D body image, the texture from adjacent body segments are determined and used to predict a texture for the selected body segment, as in 708. In some implementations, the prediction may be performed only based on adjacent segments that have been determined to be visible in the 2D body image. In other implementations, the example process 700 may consider other factors such as the body segment to be predicted, the user, textures typically used for the body segment, etc., in determining a predicted texture of the body segment. For example, if the body segment is a waist of a user, the example process may determine that the segment will likely include lower clothing and may not utilize a predicted texture from an adjacent upper leg segment. As another example, the disclosed implementations may refer to a prior 3D model generated for the user and/or other users or groups of users to determine a texture for one or more body segments that are not visible in the 2D body image. The predicted texture, however determined, is then applied to the selected body segment, as in 710.

After applying the texture of a visible body segment as determined from the 2D body image or applying a predicted texture to the selected segment, a determination is made as to whether additional segments of the body are to be textured, as in 712. If it is determined that additional segments are to be textured, the example process 700 returns to block 702 and continues. If it is determined that no additional segments are to be textured, the example process 700 completes, as in 714. Upon completion of the example process 700, the textured 3D model may be returned to the example process 500 (FIG. 5) as discussed above.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Additionally, in accordance with the present disclosure, the training of machine learning tools (e.g., artificial neural networks or other classifiers) and the use of the trained machine learning tools to generate 3D models of a body based on one or more 2D images of that body may occur on multiple, distributed computing devices, or on a single computing device.

Furthermore, although some implementations of the present disclosure reference the use of separate machine learning tools or separate CNNs for processing segmented silhouettes, for concatenating features determined from segmented silhouettes, and/or for generating the 3D model of the body, the systems and methods of the present disclosure are not so limited. Features, predicted body parameters, and/or 3D models may be determined and generated using a single CNN, or with two or more CNNs, in accordance with the present disclosure.

Likewise, while the above discussions focus primarily on generating a 3D model of a body using multiple 2D body images of the body, in some implementations, the 3D model may be generated based on a single 2D body image of the body. In other implementations, two or more 2D body images of the body from different orientations may be used with the disclosed implementations. In general, the more 2D body images of the body from different orientations, the more accurate the final representation and dimensions of the 3D model may be.

Still further, while the above implementations are described with respect to generating 3D models of human bodies represented in 2D body images, in other implementations, non-human bodies, such as dogs, cats, or other animals may be modeled in 3D based on 2D representations of those bodies. Accordingly, the use of a human body in the disclosed implementations should not be considered limiting.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5, 6A, 6B, and 7 or the transition diagrams shown in FIGS. 1A, 2A, and 2B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving a two-dimensional ("2D") partial body image of a human body from a 2D camera, wherein the 2D partial body image represents less than all of the human body;
   processing the 2D partial body image to at least:
   generate a first body segment including a first plurality of pixels of the 2D partial body image that represent a first segment of the human body;
   generate a second body segment including a second plurality of pixels of the 2D partial body image that represent a second segment of the human body that is different than the first segment of the human body;
   determine a third plurality of pixels of the 2D partial body image that do not represent the human body;
   determine a first plurality of 2D landmarks corresponding to the human body that are visible in the 2D partial body image; and
   determine a second plurality of 2D landmarks corresponding to the human body that are not visible in the 2D partial body image;
   generating, based at least in part on the first body segment, the second body segment, and the first plurality of 2D landmarks, a three-dimensional ("3D") model of the human body, wherein the 3D model includes at least:
   a first 3D model segment corresponding to the first segment;
   a second 3D model segment corresponding to the second segment; and
   a third 3D model segment corresponding to a portion of the human body that is not visible in the 2D partial body image;
   comparing the first 3D model segment and the second 3D model segment with at least one of the 2D partial body image or the first body segment and the second body segment to determine a difference between the 3D model and the at least one of the 2D partial body image or the first body segment and the second body segment; and
   adjusting at least one of the first 3D model segment, the second 3D model segment, or the third 3D model segment based at least in part on the difference to produce a revised 3D model of the human body.

2. The computer-implemented method of claim 1, further comprising:
   receiving a second 2D body image of the human body from the 2D camera;
   processing the second 2D body image to generate a third body segment including a fourth plurality of pixels of the second 2D body image that represent a third segment of the human body; and
   wherein generating the 3D model is further based at least in part on the third body segment.

3. The computer-implemented method of claim 2, wherein the third body segment corresponds to the first segment of the human body.

4. The computer-implemented method of claim 2, wherein the second 2D body image is a second 2D partial body image that represents less than all of the human body.

5. The computer-implemented method of claim 1, further comprising:
   augmenting the revised 3D model of the human body with at least one texture of the human body represented in the 2D partial body image.

6. A computing system, comprising:
   one or more processors;
   a memory storing program instructions that when executed by the one or more processors cause the one or more processors to at least:
   receive a two-dimensional ("2D") partial body image of a body, wherein the 2D partial body image represents less than all of the body;
   process the 2D partial body image to at least:
   determine, based at least in part on the 2D partial body image, a first plurality of features corresponding to the body;

concatenate the first plurality of features and a second plurality of features corresponding to the body and determined from a second 2D body image of the body to produce concatenated features;

process at least the concatenated features to produce a plurality of predicted body parameters representative of the body, wherein the plurality of predicted body parameters include a plurality of 2D landmarks corresponding to the body; and produce a plurality of visibility indicators, each of the plurality of visibility indicators corresponding to a 2D landmark of the plurality of 2D landmarks and indicating whether the 2D landmark is visible in the 2D partial body image;

generate, based at least in part on the plurality of predicted body parameters and the plurality of visibility indicators, a three-dimensional ("3D") model representative of the body, wherein the 3D model includes a 3D model of at least a portion of the body that is not represented in the 2D partial body image;

determine a difference between the 3D model and the body represented in the 2D partial body image; and adjust the 3D model based at least in part on the difference to produce a revised 3D model of the body.

7. The computing system of claim 6, wherein the program instructions that when executed by the one or more processors to cause the one or more processors to adjust the 3D model, further include instructions that, when executed by the one or more processors, further cause the one or more processors to at least:

adjust, based at least in part on the difference, at least one of a plurality of 3D model segments of the 3D model to produce a revised plurality of 3D model segments; and generate, based at least in part on the revised plurality of 3D model segments, the revised 3D model of the body.

8. The computing system of claim 7, wherein at least one of the plurality of 3D model segments correspond to a portion of the body that is not represented in the 2D partial body image.

9. The computing system of claim 6, wherein the program instructions that when executed by the one or more processors to cause the one or more processors to process the 2D partial body image, further include instructions that, when executed by the one or more processors, further cause the one or more processors to at least:

generate a plurality of body segments, each body segment including a plurality of pixels representative of a corresponding segment of the body represented in the 2D partial body image; and determine, based at least in part on the plurality of body segments, at least one segment of the body that is not visible in the 2D partial body image.

10. The computing system of claim 6, wherein the program instructions that when executed by the one or more processors to cause the one or more processors to determine a difference between the 3D model and the body, further include instructions that, when executed by the one or more processors, further cause the one or more processors to at least:

generate, based at least in part on the 3D model, a 2D model image representative of the 3D model; and determine the difference between the 2D model image and the body represented in the 2D partial body image.

11. The computing system of claim 10, wherein the program instructions that when executed by the one or more processors to cause the one or more processors to determine a difference, further include instructions that, when executed by the one or more processors, further cause the one or more processors to at least:

determine a plurality of 2D landmarks corresponding to the body;

determine a plurality of model 2D landmarks of the 3D model; and adjust the 3D model to align the model 2D landmarks with the plurality of 2D landmarks.

12. The computing system of claim 11, wherein the program instructions that when executed by the one or more processors to cause the one or more processors to determine a difference, further include instructions that, when executed by the one or more processors, further cause the one or more processors to at least:

determine an approximate pose of the body represented in the 2D partial body image;

adjust the 3D model to the approximate pose; and determine the difference between the plurality of model 2D landmarks of the 3D model adjusted to the approximate pose.

13. The computing system of claim 11, wherein the program instructions that when executed by the one or more processors to cause the one or more processors to determine a difference, further include instructions that, when executed by the one or more processors, further cause the one or more processors to at least:

generate, based at least in part on the 3D model adjusted to the plurality of 2D landmarks, a 2D model image representative of the 3D model adjusted to the plurality of 2D landmarks; and determine the difference between the 2D model image and the body represented in the 2D partial body image.

14. The computing system of claim 6, wherein the program instructions that when executed by the one or more processors further cause the one or more processors to at least:

augment the revised 3D model with at least one texture of the body represented in the 2D partial body image.

15. A method, comprising:

processing a first two-dimensional ("2D") partial body image that includes a representation of a body from a first view to at least:

generate a first body segment including a first plurality of pixels of the first 2D body image that represent a first segment of the body;

generate a second body segment including a second plurality of pixels of the first 2D body image that represent a second segment of the body that is different than the first segment of the body;

determine a third plurality of pixels of the 2D body image that do not represent the body;

determine a first plurality of 2D landmarks corresponding to a first portion of the body that is visible in the 2D body image; and determine a second plurality of 2D landmarks corresponding to a second portion of the body that is not visible in the 2D body image;

generating, based at least in part on the first body segment, the second body segment, and the first plurality of 2D landmarks, a three-dimensional ("3D") model of the body, wherein the 3D model includes at least:

a first 3D model segment corresponding to the first body segment;

a second 3D model segment corresponding to the second body segment and a third 3D model segment corresponding to a portion of the body that is not visible in the 2D body image;

comparing the first 3D model segment and the second 3D model segment with at least one of the 2D body image or the first body segment and the second body segment to determine a difference between the 3D model and at least one of the 2D body image or the first body segment and the second body segment; and adjusting, based at least in part on the difference, at least one of the first 3D model segment or the third 3D model segment to produce a revised 3D model of the body.

16. The method of claim 15, wherein adjusting includes adjusting the modeling of the second 3D model segment.

17. The method of claim 15, wherein:

the revised 3D model is an approximate representation of a shape of the body; and one or more measurements of the body may be determined from the revised 3D model.

18. The method of claim 15, wherein generating the 3D model further includes:

generating, based at least in part on the first body segment, the first plurality of 2D landmarks, and a known height of the body, the 3D model.

19. The method of claim 15, wherein the second portion of the body that is not visible is at least one of beyond a field of view represented in the 2D body image or occluded by an object.

* * * * *